United States Patent
Naoi et al.

[11] Patent Number: 6,081,618
[45] Date of Patent: *Jun. 27, 2000

[54] METHOD AND AN APPARATUS FOR EXTRACTING A CONNECTED ELEMENT FROM A BINARY IMAGE

[75] Inventors: Satoshi Naoi, Kawasaki; Hideki Yanagishita, Yokohama, both of Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/959,712

[22] Filed: Oct. 28, 1997

Related U.S. Application Data

[63] Continuation of application No. 08/443,770, May 18, 1995, abandoned.

[30] Foreign Application Priority Data

| May 31, 1994 | [JP] | Japan | 6-117325 |
| Aug. 11, 1994 | [JP] | Japan | 6-189375 |
| Mar. 24, 1995 | [JP] | Japan | 7-065961 |

[51] Int. Cl.$^7$ ................................................. G06K 9/46
[52] U.S. Cl. .............................................................. 382/180
[58] Field of Search ................................ 382/177, 178, 382/179, 204, 173, 180, 282, 283

[56] References Cited

U.S. PATENT DOCUMENTS

| 4,624,013 | 11/1986 | Urushibata | 382/9 |
| 5,001,765 | 3/1991 | Jeanty | 382/179 |
| 5,018,214 | 5/1991 | Pasch | 382/9 |
| 5,054,091 | 10/1991 | Tanaka et al. | 382/177 |
| 5,113,451 | 5/1992 | Chapman et al. | 382/8 |
| 5,199,083 | 3/1993 | Takeda | 382/26 |
| 5,216,725 | 6/1993 | McCubbrey | 382/177 |
| 5,321,768 | 6/1994 | Fenrich et al. | 382/178 |
| 5,774,579 | 6/1998 | Wang et al. | 382/176 |

FOREIGN PATENT DOCUMENTS

| 5-237552 | 9/1993 | Japan | B21D 5/08 |
| 7-93539 | 4/1995 | Japan | G06T 7/00 |

OTHER PUBLICATIONS

Proceedings of the Spie–The International Society for Optical Engineering, vol. 1027, pp. 68–76, M. Komeichi et al., "Video–Rate Labeling Processor".

Ishiyama et al., "Labeling Board Based on Boundary Tracking," *IEEE Proc. 11th IAPR Int. Conf. on Patternn Recognition*, Aug. 30–Sep. 3, 1992, pp. 34–38.

Shima et al., "A High Speed Algorithm for Propagation–type Labeling based on Block Sorting of Runs in Binary Images," *IEEE Proc. 10th Int. Conf. on Pattern Recognition*, Jun. 16–21 1990, pp. 655–658.

*Primary Examiner*—Andrew W. Johns
*Attorney, Agent, or Firm*—Staas & Halsey, LLP

[57] ABSTRACT

The connected element extraction device stores a binary image signal as binary image data; calculates a rectangle circumscribing a connected element; determines whether the rectangle overlaps with others and stores the label and coordinates of an overlapping rectangle; generates a label image of the overlapping rectangle; based on the label image, divides the overlapping rectangle as a parent rectangle into child rectangles and repeatedly subdivides the child-rectangle into final child rectangles which respectively have a single label; and outputs information comprising the binary image data, and the coordinates of the non-overlapping rectangle, parent-rectangle and final child-rectangles.

59 Claims, 35 Drawing Sheets

MAXLABEL(= m)

| 1 | X11 | Y11 | X21 | Y21 |
| 2 | X12 | Y12 | X22 | Y22 |
| 3 | X13 | Y13 | X23 | Y23 |
| ⋮ | ⋮ | ⋮ | ⋮ | ⋮ |
| m | X1m | Y1m | X2m | Y2m |

| LABEL NO. | OVERLAPPING | OVERLAPPED RECTANGLE LABEL | | | |
|---|---|---|---|---|---|
| 1 | ABSENT | | | · | |
| 2 | ABSENT | | | · | |
| 3 | PRESENT | 4 | | · | |
| 4 | PRESENT | 3 | | · | |
| ⋮ | ⋮ | ⋮ | ⋮ | ⋮ | ⋮ |
| m | ABSENT | | | | |

FIG. 7

| LABEL NO. | COORDINATES | | | |
|---|---|---|---|---|
| 1 | X11 | Y11 | X21 | Y21 |
| 2 | X12 | Y12 | X22 | Y22 |
| ⋮ | ⋮ | ⋮ | ⋮ | ⋮ |
| m | X1m | Y1m | X2m | Y2m |

FIG. 8

| LABEL NO. | OVERLAPPING RECTANGLE | | | | STARTING ADDRESS | OVERLAPPED RECTANGLE LABEL | |
|---|---|---|---|---|---|---|---|
| 3 | X13 | Y13 | X23 | Y23 | ADDRESS 3 | 4 | . |
| 4 | X14 | Y14 | X24 | Y24 | ADDRESS 4 | 3 | . |
| ... | ... | ... | ... | ... | ... | ... | |

FIG. 9 inflag= in (X1i, Y1i, X2i, Y2i, a, b) :

- (1) if (X1i ≤ a AND a ≤ X2i AND Y1i ≥ b AND b ≥ Y2i) THEN
  - (2) if (X1i < a AND a < X2i AND Y1i > b AND b > Y2i)

inflag = 0X20 (INSIDE)

- (3) else if { (X1i = a  AND  Y1i = b)
                OR (X2i = a  AND  Y1i = b)
                OR (X1i = a  AND  Y2i = b)
                OR (X2i = a  AND  Y2i = b) } inflag = 0X02 (VERTEX)

- (4) else inflag = 0X08 (BOUNDARY)

- (5) else inflag = 0X00 (OUTSIDE)

FIG. 12A

Reverse-inflag inflag = in (X1j, Y1j, X2j, Y2j, X1i, Y1i)
inflag = in (X1j, Y1j, X2j, Y2j, X2i, Y1i) + inflag
inflag = in (X1j, Y1j, X2j, Y2j, X1i, Y2i) + inflag
inflag = in (X1j, Y1j, X2j, Y2j, X2i, Y2i) + inflag

FIG. 12B dis(i, j) :

dis(i, j) = max ( | X2i-X1j | , | Y2i-Y1j | )

WHERE Th = max. size x B (COEFFICIENT)

FIG. 12C

| LABEL | NO. OF RE-CALCU-LATED RECTS | RE-CALCULATED RECTANGLE COORDINATES | | | | LABEL CON-CERNED | SINGLE LABEL | RE-CALCULATED RECTANGLE COORDINATES | | | | LABEL CON-CERNED | SINGLE LABEL |
|---|---|---|---|---|---|---|---|---|---|---|---|---|---|
| 3 | 2 | X131 | Y131 | X231 | Y231 | YES | — | X132 | Y132 | X232 | Y232 | NO | NO |
| 4 | 2 | X141 | Y141 | X241 | Y241 | YES | — | X142 | Y142 | X242 | Y242 | NO | NO |
| 5 | 2 | X151 | Y151 | X251 | Y251 | YES | — | X152 | Y152 | X252 | Y252 | NO | YES |
| 6 | 1 | X161 | Y161 | X261 | Y261 | YES | — | NONE | | | | — | — |
| • | • | • | • | • | • | • | • | • | | | | • | • |

FIG. 19

| LABEL | OVERLAPPING REC | | | | STARTING ADDRESS | SINGLE-LABEL SUB-RECT | | | |
|---|---|---|---|---|---|---|---|---|---|
| 3 | X13 | Y13 | X23 | Y23 | ADDRESS 3 | | | | |
| 4 | X14 | Y14 | X24 | Y24 | ADDRESS 4 | | | | |
| 5 | X15 | Y15 | X25 | Y25 | | X152 | Y152 | X252 | Y252 |
| 6 | X16 | Y16 | X26 | Y26 | | | | | |
| . | . | . | . | . | . | . | | | |

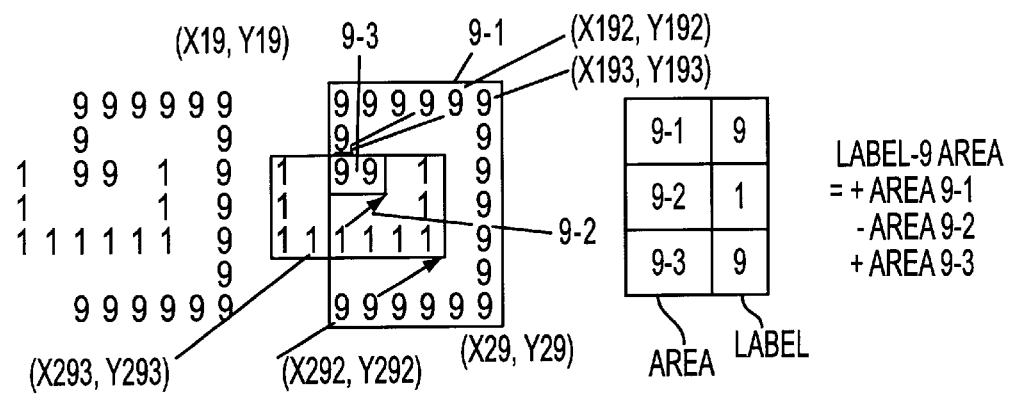
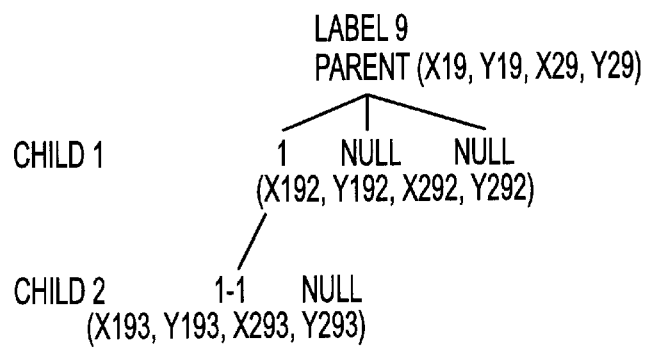
FIG. 26

| LABEL | Re-calculated Rectangle Coordinates (Parent) | | | | Re-calculated Rectangle Coordinates (Child 1) | | | | OPE-RATOR | Re-calculated Rectangle Coordinates (Child 2) | | | | OPE-RATOR |
|---|---|---|---|---|---|---|---|---|---|---|---|---|---|---|
| · | · | · | · | · | · | · | · | · | · | · | · | · | · | · |
| · | · | · | · | · | · | · | · | · | · | · | · | · | · | · |
| 9 | X19 | Y19 | X29 | Y29 | X192 | Y192 | X292 | Y292 | 1 | X193 | Y193 | X293 | Y293 | 1-1 |
| · | · | · | · | · | | | | | · | | | | | · |
| · | · | · | · | · | | | | | · | | | | | · |

FIG. 27

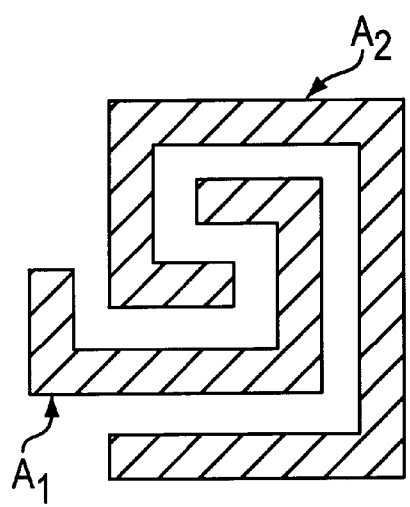
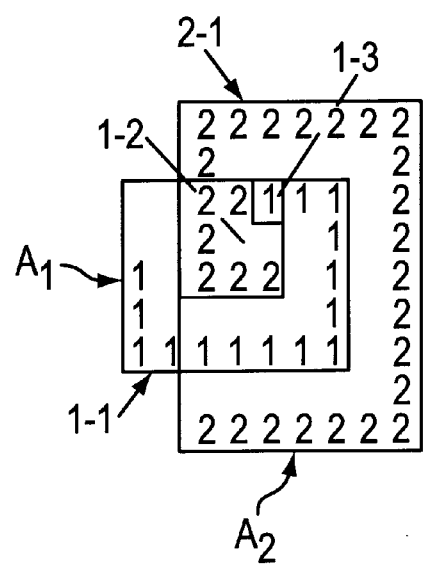
FIG. 31A                    FIG. 31B

| LABEL | LABEL OF OVERLAPPED RECTANGLE | | | |
|---|---|---|---|---|
| 3 | 4 | | · | |
| 4 | 3 | | · | |
| 6 | 5 | | · | |
| 5 | 6 | | · | |
| ⋮ | ⋮ | ⋮ | ⋮ | ⋮ |

FIG. 36

| LABEL | OVERLAPPING RECTANGLE | | | | SUB-RECTANGLE | | | | OPE-RATOR | LABEL PROCESSED |
|---|---|---|---|---|---|---|---|---|---|---|
| 3 | X13 | Y13 | X23 | Y23 | X132 | Y132 | X232 | Y232 | − | · |
| · | · | · | · | · | X133 | Y133 | X233 | Y233 | + | · |
| · | · | · | · | · | · | · | · | · | + | · |
| 5 | X15 | Y15 | X25 | Y25 | · | · | · | · | · | 6 |

FIG. 37

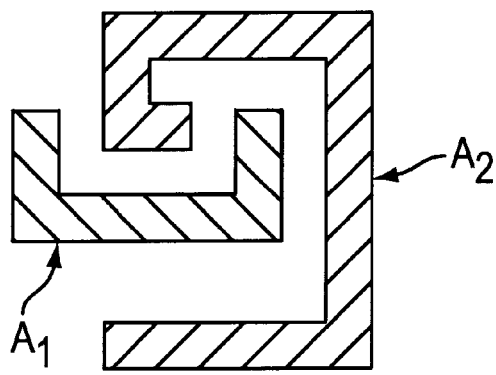
FIG. 39A
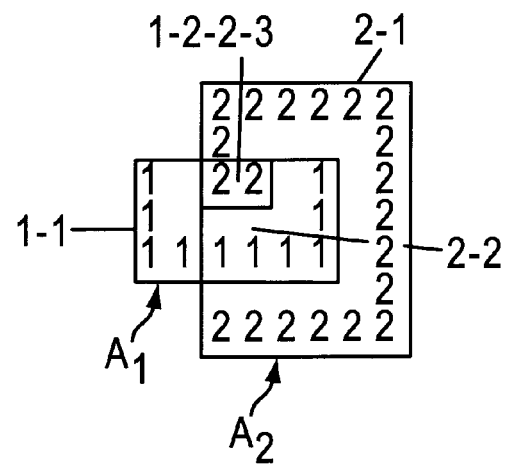
FIG. 39B
FIG. 39C
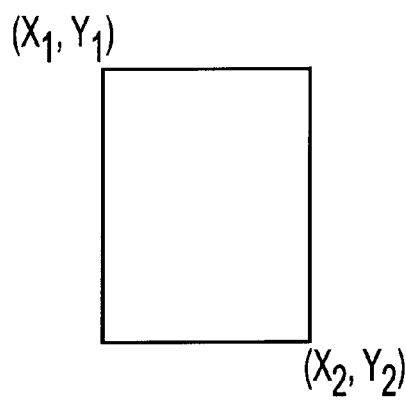
FIG. 39D

METHOD AND AN APPARATUS FOR EXTRACTING A CONNECTED ELEMENT FROM A BINARY IMAGE

This application is a continuation, of application Ser. No. 08/443,770, filed May 18, 1995, now abandoned.

BACKGROUND OF THE INVENTION

1. Field of the Invention

The present invention relates to a method and apparatus for extracting a connected element which has continuity and connectedness in a binary image, particularly to same requiring small amount of storage capacity.

In recent years, a labeling technique for extracting the connected element is becoming more and more important as a means to analyze an image and cut out characters and figures, etc. from the image. For instance, the labeling technique is used for an optical character recognition device (OCR) as a pre-processing means to cut out individual character elements from individual handwritten characters. It is also used in a wide variety of applications for image processing including inspection and monitoring of an image.

2. Description of the Related Art

FIG. 1 illustrates a conventional method for extracting and labeling a connected element.

In a conventional method, a label processor calculates from input binary image data, a connected element having image-representing pixels connected in one in a binary image (three connected elements are shown in FIG. 1) and provides a label to the connected element. The label processor stores the labeled connected elements (labeled 1, 2 and 3 in FIG. 1) in a label image storage as a label image data for later use in image processing (e.g., image analysis and document image processing) by an image processing unit (not shown).

The label processing method used here is known by "Raster Scan-type Label Processing Method" (Japanese Patent Application Provisional Number (TOKUGANHEI) 03-206574) and "Label Processing Method" (Japanese Patent Application Provisional Number (TOKUGANHEI) 05-237552), for example.

However, the conventional method labels connected elements of the input binary image and stores the data as label image data, storage capacity required for storing the label image data increases in proportion to the number of connected elements. Since labeling 255 connected elements, for example, requires 8 bits per pixel and the pixel is represented using 1 bit in the input binary image, data amount required for storing label image data is 8 times the number of pixels included in an entire picture. That is, assuming that the number of pixels in the picture is n, the storage capacity required amounts to 8n.

In usual image processing, the number of labels included in a picture is much more than 255, e.g., 64K (K=1024) or 4 G (G=$1024^3$), requiring 16 bits or 32 bits per pixel, respectively. Therefore, the data amount required is 16 or 32 times the number of pixels included in the picture, respectively. Accordingly, it is a problem with the conventional method that an enormous amount of storage capacity is required when the label processing is performed on the input binary image data. Especially when a general-purpose processor is used for label processing, it is a problem that processing speed is remarkably reduced due to lack of storage capacity.

SUMMARY OF THE INVENTION

It is an object of the present invention to provide an economical method and apparatus for extracting a connected element, requiring small amount of storage capacity in outputting label image data to an image processing unit which performs such image processing as image analysis and document image processing.

To achieve the above and other objects, the present invention provides binary image storage, rectangle calculation means, overlap determination means, label image generation means, division means and output means.

The binary image storage stores the input binary image signal as binary image data. The rectangle calculation means calculates a rectangle circumscribing the connected element by performing the label processing on the binary image data. The overlap determination means determines whether the rectangle overlaps with others and stores the label and coordinates of the overlapping rectangle. The label image generation means generates a label image of the overlapping rectangle by performing the label processing on the overlapping rectangle. The division means, based on the label image, divides the overlapping rectangle, which is a parent-rectangle, into child-rectangles. The division means repeatedly subdivides each child-rectangle into final child-rectangles, which respectively have a single label. The division means calculates coordinates of the final child-rectangles. The output means outputs information comprising the binary image data, the coordinates of the non-overlapping rectangle, the parent-rectangle and the final child-rectangles.

BRIEF DESCRIPTION OF THE DRAWINGS

FIG. 7 shows an overlapping rectangle table;

FIG. 8 shows a non-overlapping rectangle storage;

FIG. 9 shows an overlapping rectangle storage;

FIGS. 12A–12C are equations defining an "inflag", "reverse inflag" and dis (i, j), respectively;

FIG. 19 is a diagram illustrating re-calculated rectangle storage of the third embodiment;

FIG. 26 is a diagram illustrating sub-division of a sub-rectangle;

FIG. 27 is a diagram illustrating re-calculated rectangle storage of the fifth embodiment;

FIGS. 31A and 31B show connected elements and rectangles each circuscribing a label, respectively;

FIG. 36 shows a table of sorted overlapping rectangles;

FIG. 37 shows overlapping rectangle storage;

FIGS. 39A–39D show connected elements, the label images, the rectangles and coordinates specifying a rectangle, respectively.

Throughout the above-mentioned drawings, identical reference numerals are used to designate the same or similar component parts.

DESCRIPTION OF THE PREFERRED EMBODIMENTS

Figure 40:
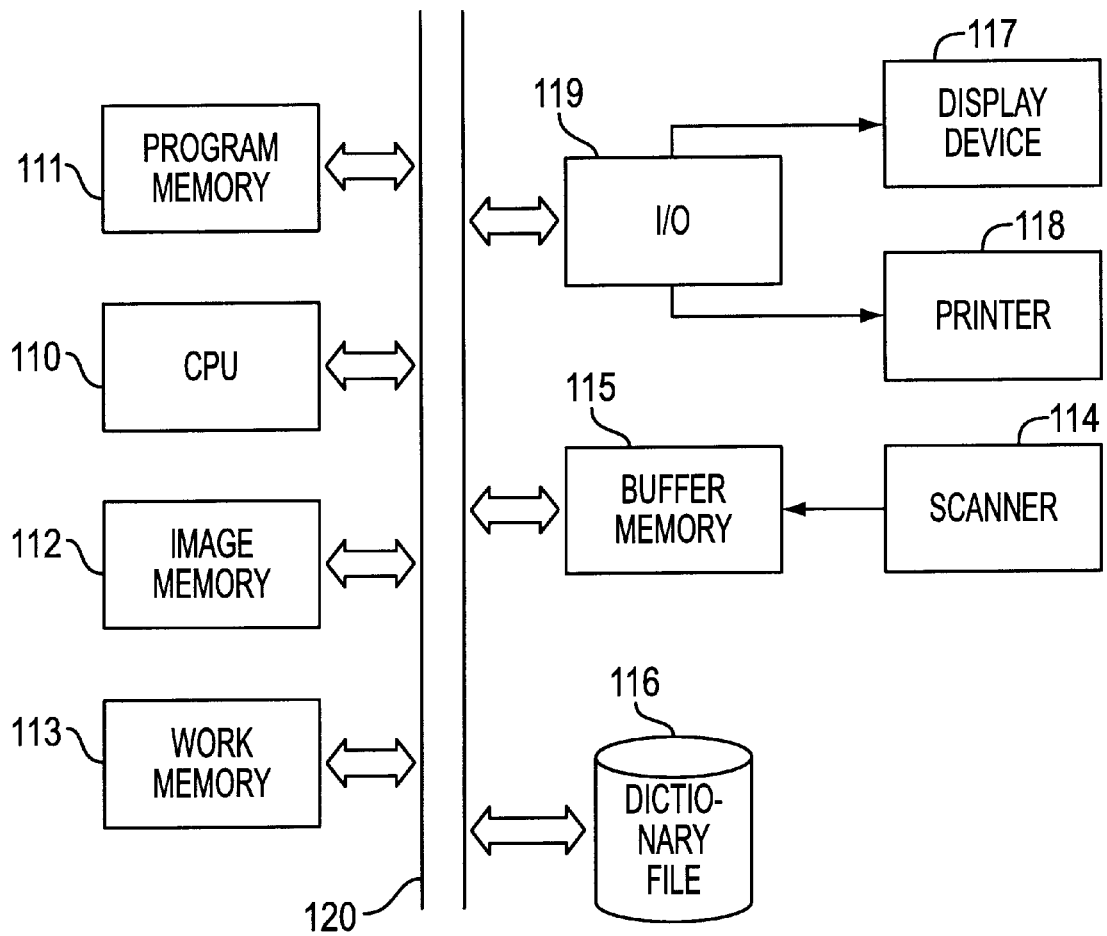
FIG. 40 shows a configuration of a character recognition system.

FIG. 40 shows a configuration of a character recognition system, to which an apparatus for extracting a connected element (called a connected element extraction device) of the present invention is applied.

The character recognition system includes a central processing unit (CPU) 110, a program memory 111 for storing programs executed by the CPU 110, an image memory 112 for storing image data in a pixel-for-bit (bit-map) basis and a work memory 113 for use in processing the image data, all of which are interconnected via a bus 120. The system further includes an image scanner 114 for optically reading an image of a picture, a buffer memory 115 for temporarily storing the image data read by the scanner 114, a dictionary file 116 for storing formal features of individual character images, and an input-output (I/O) interface circuit 119 for controlling a display unit 117 and a printer 118, all of which are also interconnected via a bus 120.

The image data read by the scanner 114 is temporarily stored in the buffer memory 115 and stored in the image memory 112 in a bit-map format. Then, the image data in the the image memory 112 is copied into the work memory 113 as binary image data and subjected to the connected element extraction processing of the present invention. A character image is cut out from the above-extracted connected elements and compared with the data stored in the dictionary file 116 in terms of formal features of characters to recognize a character. Then, the characters recognized are output to the display unit 117 or printer 118. The functions of the connected element extraction device are achieved by the program stored in the program memory 111 and executed by the CPU 110 shown in FIG. 40.

Figure 1:
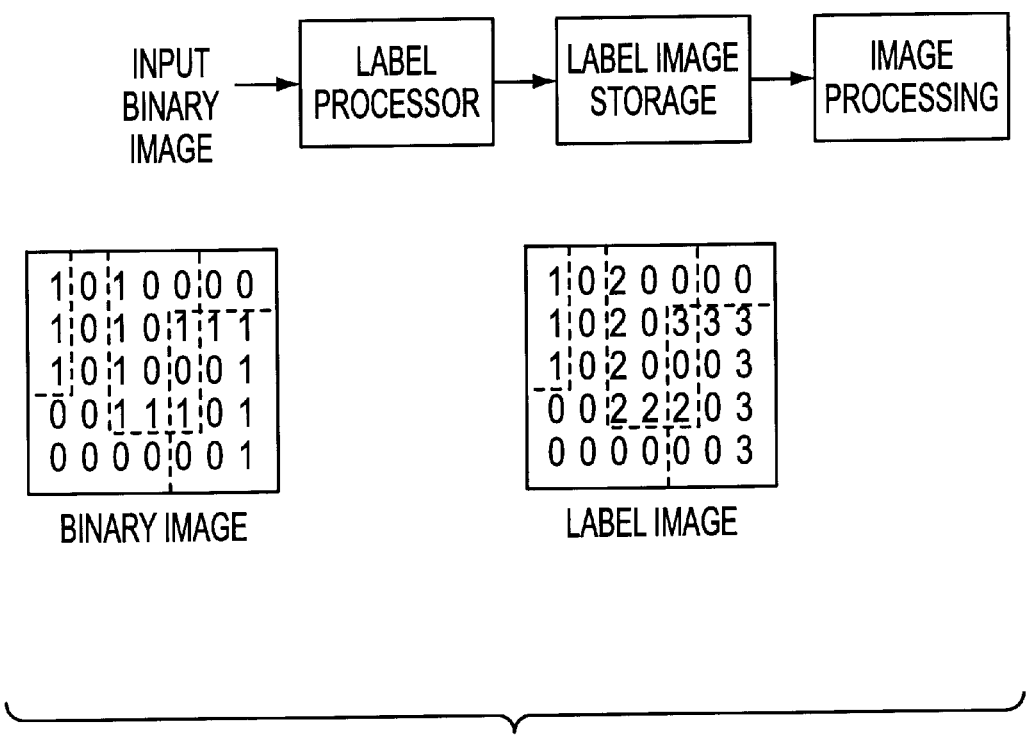
FIG. 1 illustrates a conventional method for extracting a connected element.
Figure 2:
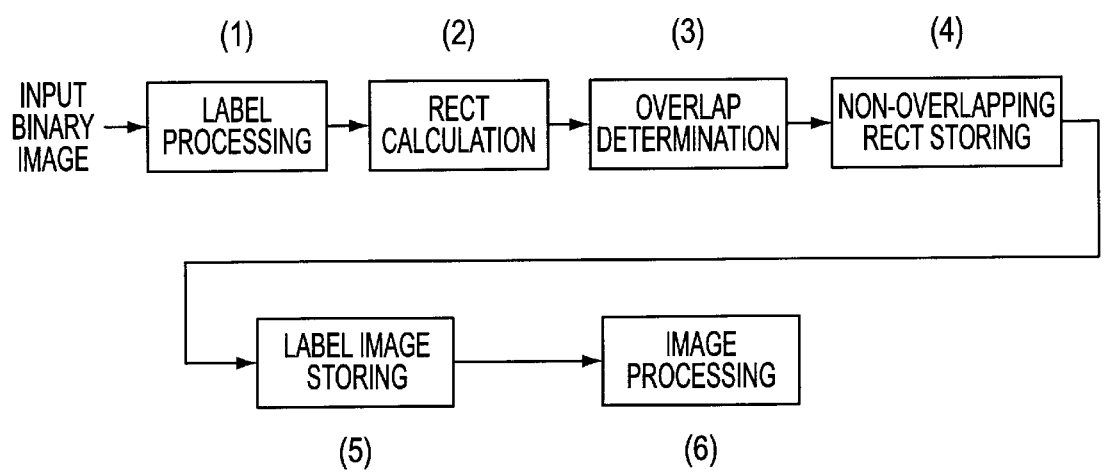
FIG. 2 is a flowchart illustrating an outline of the first embodiment.

FIG. 2 is a flowchart illustrating an outline of the first embodiment of the present invention, which (1) performs the label processing to extract from input binary image data, label images which have respective connected elements (or image patterns) labeled for identifying the connected elements;

(2) calculates a rectangle (including a square) circumscribing a labeled connected elements (hereinafter simply called a rectangle) and calculates the left-top and right-bottom coordinates of the rectangle on an orthogonal X-Y coordinate (hereinafter the term "rectangle" may imply its label and coordinates as an attribute; (The aforesaid operations performed separately in steps (2) and (3) may be performed simultaneously as described in "Label Processing Method" (Japanese Patent Application Provisional Number (TOKUGANHEI) 05-237552).)

(3) determines whether a rectangle overlaps with others;

(4) stores a non-overlapping rectangle; and (5) stores the label image of an overlapping rectangle as it is or as a binary image.

(6) Thereafter, image processing (e.g., image analysis and document image processing) is conducted by using thus-stored data.

The label image of the non-overlapping rectangle can naturally be reproduced from its coordinates stored in the above step (4) and the binary image data. Accordingly, it need only store the non-overlapping rectangles and label images of overlapping rectangles to reproduce the label image of an entire picture, remarkably reducing the storage capacity required, compared with the conventional methods which need store all the label images of the entire picture.

Figure 3:
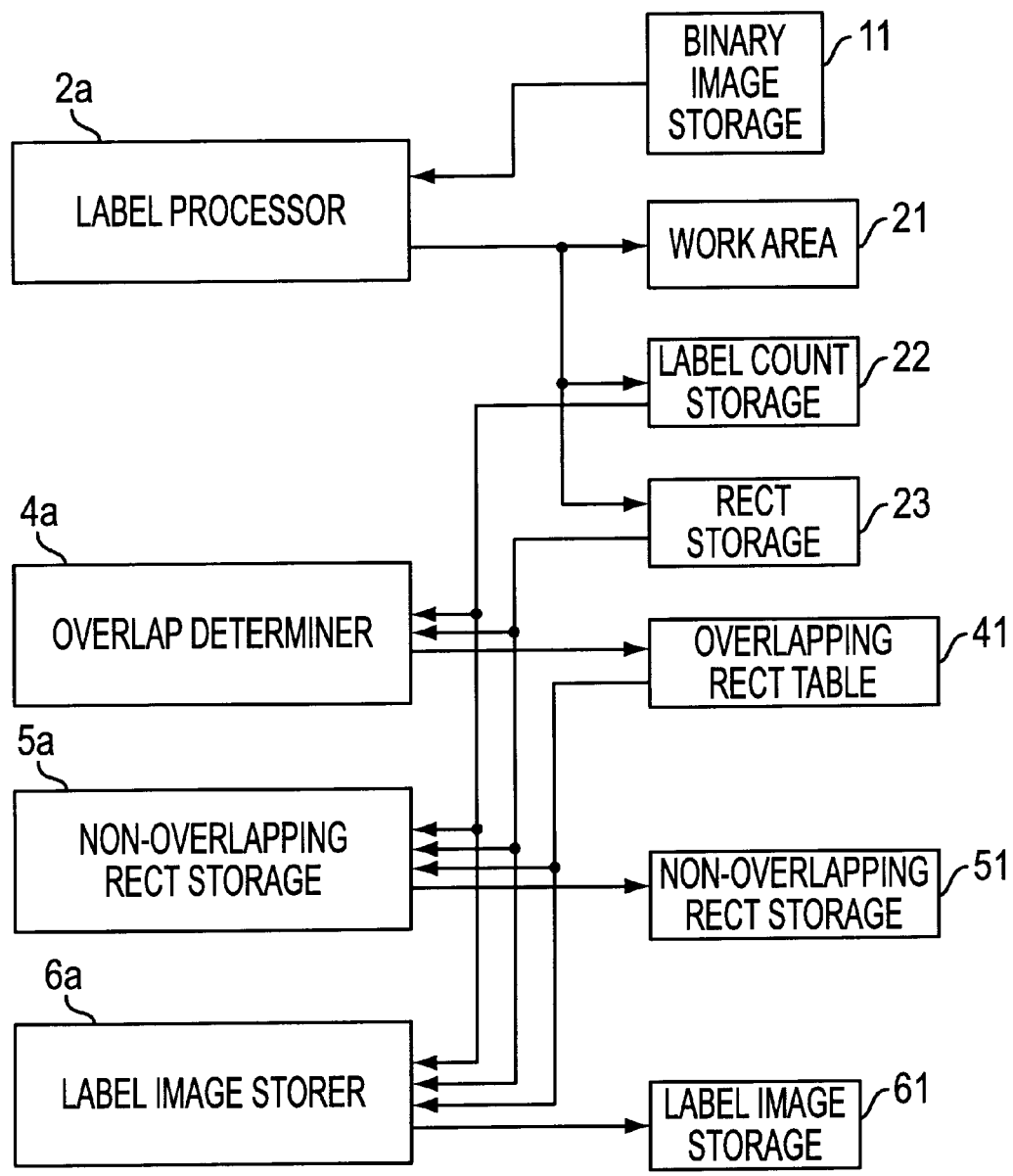
FIG. 3 is a block diagram illustrating the first embodiment.

FIG. 3 is a block diagram illustrating the first embodiment of the present invention.

A label processor 2a, an overlap determiner 4a, a non-overlapping rectangle storer 5a and a label image storer 6a are programs stored in the program memory 111. Binary image storage 11, label count storage 22, a work area 21, rectangle storage 23, an overlapping rectangle table 41, non-overlapping rectangle storage 51 and label image storage 61 are areas provided in the work memory 113 (see FIG. 40).

An input image signal is converted into binary data after being cleared of noises and stored in the binary image storage 11 as binary image data. The label processor 2a reads the binary image data from the binary image storage 11 and calculates the number of labels, label image and rectangles using the known "Label Processing Method" (Japanese Patent Application Provisional Number (TOKUGANHEI) 05-237552), for example. Then, it stores the respective data in the label count storage 22, work area 21 and rectangle storage 23.

The overlap determiner 4a determines whether a rectangle overlaps with others and stores the determination result (present/absent) in the overlapping rectangle table 41. The non-overlapping rectangle storer 5a stores the rectangles which do not overlap with others in the non-overlapping rectangle storage 51. The label image storer 6a stores in the label image storage 61, the overlapping rectangle, the label of the overlapped rectangle and the starting address of storage area where the label image of the overlapping rectangle is stored.

Details are explained based on FIG. 3, referring to FIGS. 4–10.

The label processor 2a executes the label processing using the aforesaid method.

Figures 4, 5, 6:
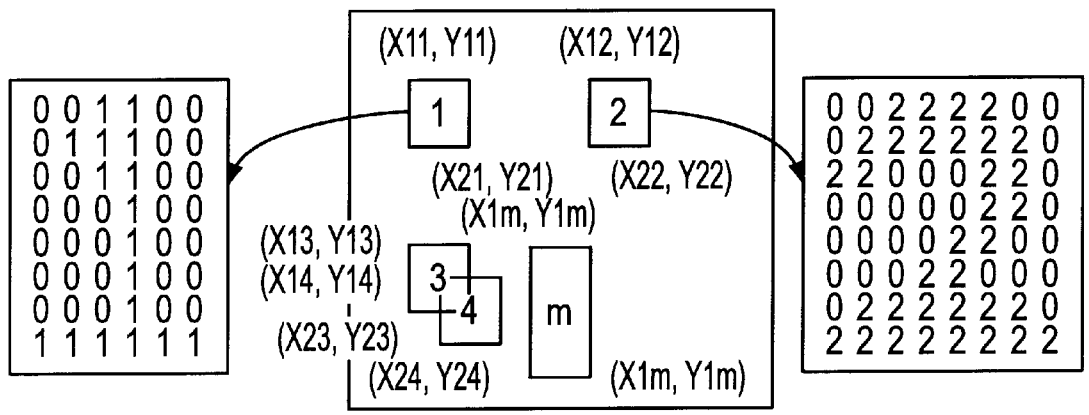
FIG. 4 is a conceptual diagram illustrating the label image.
FIG. 5 shows label count storage.
FIG. 6 shows rectangle storage.

FIGS. 4–6 show examples of the processing results. FIG. 4 is a conceptual diagram illustrating the label image, in which connected elements of the binary image are sequentially labeled (numbered) to identify the individual connected elements, from the top left to the bottom right. FIG. 5 shows the label count storage 22 for storing the maximum label number, i.e., the number of labels. FIG. 6 shows the rectangle storage 23, which stores top-left and bottom-right coordinates of a rectangle. FIG. 7 shows the overlapping rectangle table 41, which stores in a table, the presence or absence of overlapping and the label of an overlapped rectangle, corresponding to the overlapping rectangle.

Figure 11:
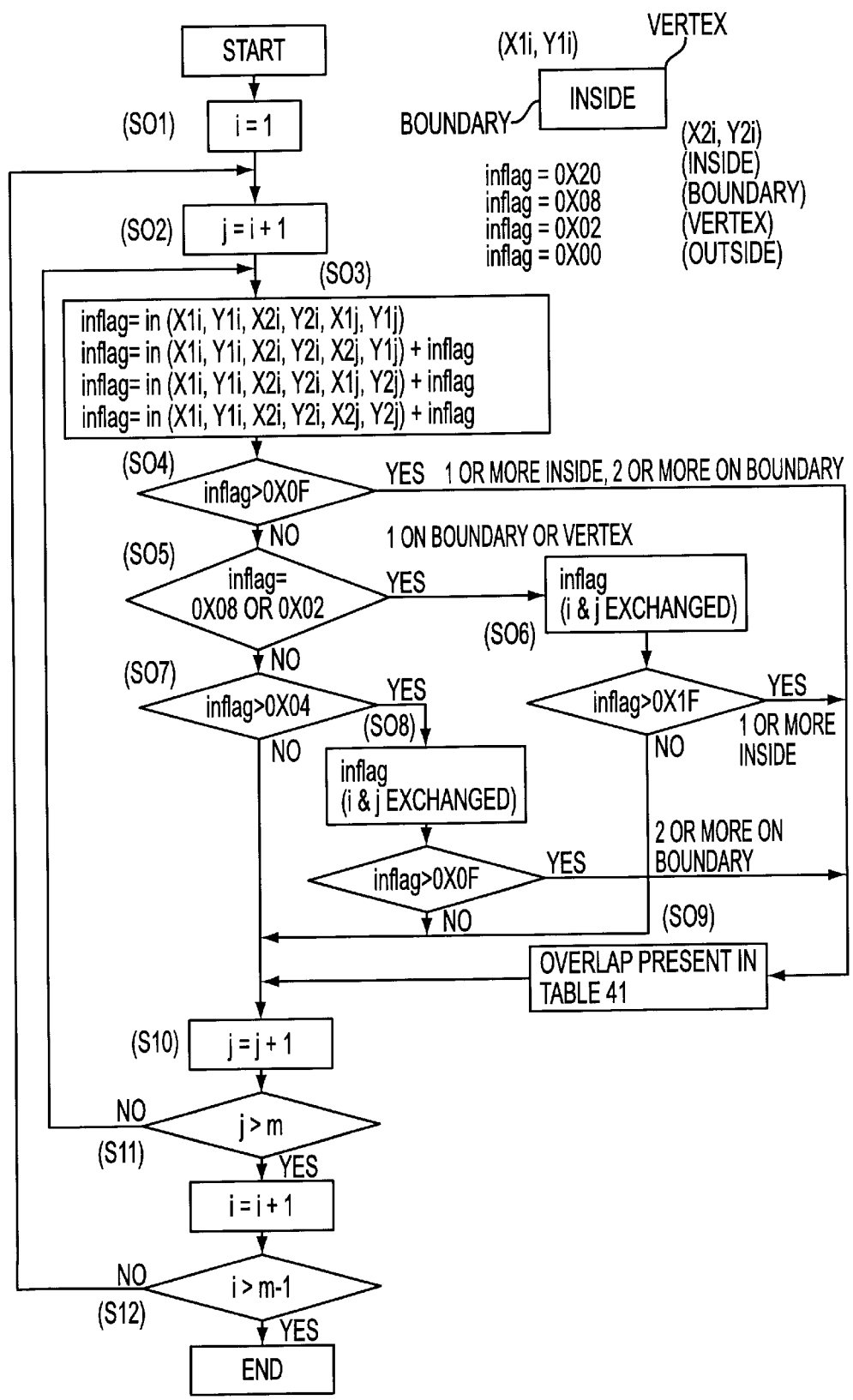
FIG. 11 is a flowchart illustrating an overlap determination method.

The overlap determiner 4a determines whether a rectangle concerned includes a vertex of another one therein, according to FIG. 11. The non-overlapping rectangle storer 5a selects non-overlapping rectangles from the rectangle storage 23 and stores the non-overlapping rectangles in the non-overlapping rectangle storage 51 (for detail, see FIG. 8).

Figure 10:
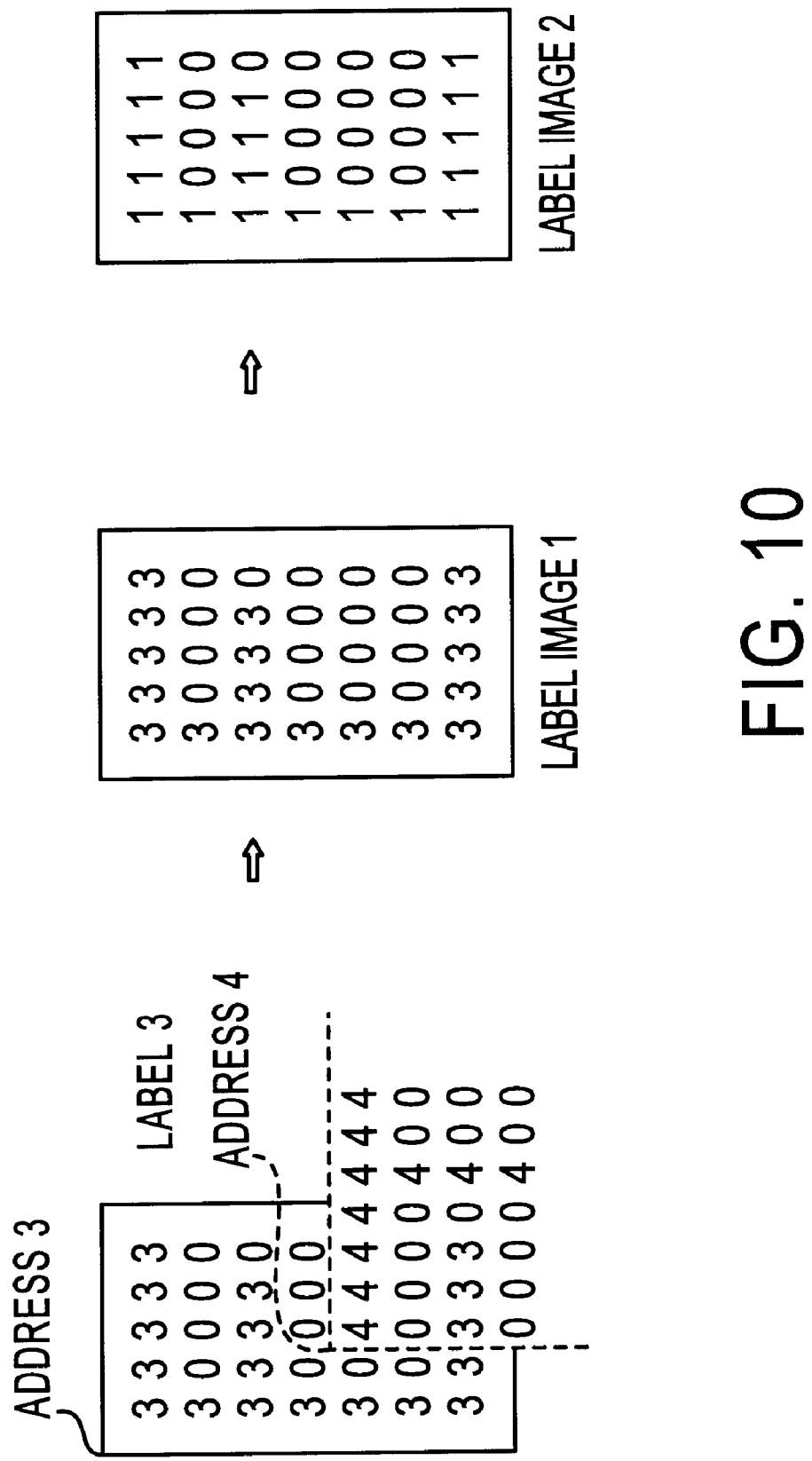
FIG. 10 is a diagram illustrating an overlapped label image.

The label image storer 6a stores in the label image storage 61 (for detail, see FIGS. 9 and 10), corresponding to an overlapping rectangle, the label of the overlapped rectangle and the starting address of storage area where the label image of the overlapping rectangle is stored, so that the label image is reproduced by cutting out the label images stored in the work area 21 with an overlapping rectangle shown in FIG. 9 and by setting a label not concerned to 0 as shown in label image 1 of FIG. 10. For data compression to reduce the data amount required for storing the label image, the label image may be represented by setting the label concerned to 1 and others to 0 as shown in label image 2 of FIG. 10).

After completion of the aforesaid processing, only the data shown in FIGS. 5, 8, 9 and 10 (and naturally the binary image data stored in the binary image storage 11) is output to the image processing unit (not shown).

Accordingly, based on the input data, the image processing unit can reproduce the label images of the entire picture: The label image of a non-overlapping rectangle can be reproduced by cutting out the binary image with the non-overlapping rectangle "coordinates" shown in FIG. 8 and by replacing "1"s with the labels concerned. The label image of the overlapping rectangle can be reproduced using the overlapping rectangle "coordinates" shown in FIG. 9 and the label image 1 (see FIG. 10) stored in the area designated by the "starting address" shown in FIG. 9. When label image data is compressed into the label image 2 as shown in FIG. 10, the label image can be reproduced by replacing "1"s with the labels concerned.

Hereinafter, the overlap determination conducted by the overlap determiner 4a is explained referring to FIG. 11. The determination is conducted according to whether a particular rectangle i includes a vertex of another rectangle j.

It is determined whether a vertex of rectangle j is included in rectangle i with i set to 1 first and then changing j from 1 to m (m is the total of rectangles). Next, i is increased by 1 (i.e., i=2) and the same determination process is repeated while changing j from 1 to m. The above determination process is repeated, changing i from 1 to m. When a pre-determined result occurs in the process of the above determination, the same determination process is conducted by exchanging i with j. That is, it is determined whether a vertex of rectangle i is included in rectangle j.

(S01) First, i is set to an initial value 1 and it is determined whether a vertex of rectangle j (j=1 to m) is included in rectangle 1.

(S02) J is set to 1 added to i (i.e., j is started with 2) and it is determined whether rectangle i overlaps with the next-numbered rectangle j (=i+1).

(S03) A formula "inflag" is used in determining an overlap between rectangles. Here, the definition of the formula inflag=in (X1i,Y1i,X2i, Y2i,a,b) is explained referring to FIG. 12A. The formula represents in hexadecimal 2digits, the positional relations (inside, vertex, boundary and outside) of a point (a,b) with respect to a rectangle whose top-left and bottom-right coordinates are (X1i,Y1i) and (X2i,Y2i), respectively. (0X is a notation indicating that the following 2 digits are hexadecimal numbers. Hexadecimal F is decimal 15).

If the condition (1) that X1i≦a, a≦X2i, Y1i≦b and, b≦Y2i is satisfied (i.e., the point (a,b) is on the boundary of or inside the rectangle) and if the condition (2) that X1i<a, a<X2i, Y1i<b, and b<Y2i is satisfied, the inflag is defined as 0X20 (inside). Unless-the condition (2) is satisfied and if the condition (3) that (X1i=a and Y1i=b), (X2i=a and Y1i=b), (X1i=a and Y2i=b) or (X2i=a and Y2i=b) is satisfied, the inflag is defined as 0X02 (vertex). Unless the above three conditions (1), (2) and (3) are satisfied simultaneously (i.e., condition (4) is satisfied), the inflag is defined as 0X08 (boundary).

Unless the condition (1) is satisfied (i.e., if condition (5) is satisfied), the inflag is defined as 0X00 (outside). Here, "inside" indicates that the point (a, b) is within the rectangle and not on a contour of the rectangle. "Vertex" indicates that the point is on a corner of the rectangle. "Boundary" indicates that the point is on a contour of the rectangle excluding the vertexes. "Outside" indicates that the point is outside the rectangle.

The four inflag formulas shown in FIG. 11 are executed one by one based on the above definition. The first term of each formula's right member determines positional relationships of 4 vertexes (X1j,Y1j), (X2j,Y1j), (X1j,Y2j) and (X2j,Y2j) of rectangle j with respect to rectangle i whose top-left and bottom-right coordinates are (X1i,Y1i) and (X2i,Y2i), respectively.

(S04) The result of the inflag operation is compared with 2-digit hexadecimal 0F (F represents decimal 15). If the former is larger than the latter (yes), it indicates that one or more vertexes of rectangle j are inside rectangle i or that two or more vertexes of rectangle j are on a boundary of rectangle i (e.g., for inflag=0X20+0X 00+0X00+0X00= 0X20, one rectangle j vertex is inside rectangle i; for inflag=0X08+0X00+0X00+0X08=0X10, two rectangle j vertexes are on a boundary of rectangle i). Then step S09 is executed.

(S05) Unless the former is larger than the latter (no) in (S04), the inflag value is compared with 0X08 or 0X02. If the inflag value is equal to either value (yes), it indicates that one vertex of rectangle j is on a boundary of rectangle i or that one vertex of rectangle j is on a vertex of rectangle i. Then step S06 is executed.

(S06) To determine whether each vertex of rectangle i is included in the rectangle j, the inflag operation with i and j exchanged (called a reverse-inflag operation) is executed as defined in FIG. 12B. Then, the operation result is compared with 0X1F. If the former is larger than the latter (yes), indicating that one or more vertexes of rectangle i are inside rectangle j, step S09 is executed. Unless the former is larger than the latter (no), step S10 is executed.

(S07) If the inflag value is not equal to 0X08 or 0X02 (no) in step S05, the inflag value is compared with 0X04. Unless the inflag value is larger than 0X04 (no) step S10 is executed; otherwise (yes), step S08 is executed.

(S08) To determine whether a vertex of rectangle i is included in rectangle j, the reverse-inflag operation is executed. Then, the operation result is compared with 0X0F. If the former is larger than the latter (yes), indicating that there are two or more vertexes of rectangle i are on a boundary of rectangle j, step S09 is executed. Unless the former is larger than the latter (no), step S10 is executed.

(S09) For rectangles i and j, an overlap "present" is indicated in the rectangle overlap table 41.

(S10) To determine whether rectangle i overlaps with the rectangle following the current rectangle j, 1 is added to j.

(S11) J, which is the addition result in step S10, is compared with the total number m of rectangles. Unless j is larger than m (no), the processing returns to step S03 to determine whether rectangle i overlaps with the next-numbed rectangle j. If j is larger than m (yes), indicating that the determination has been completed for the last-numbered rectangle j, 1 is added to i to check the next-numbered rectangle i for presence of overlapping.

(S12) i, which has been increased by 1 in step S11, is compared with (m−1). Unless i is larger than (m−1) (no), the processing returns to step S02 to check the next-numbed rectangle i for presence of overlapping. If i is larger than (m−1) (yes), indicating that the determination has been completed for the last-numbered rectangle i and already for the last-numbered rectangle j in step S11, the overlap determination processing is completed.

Figure 13:
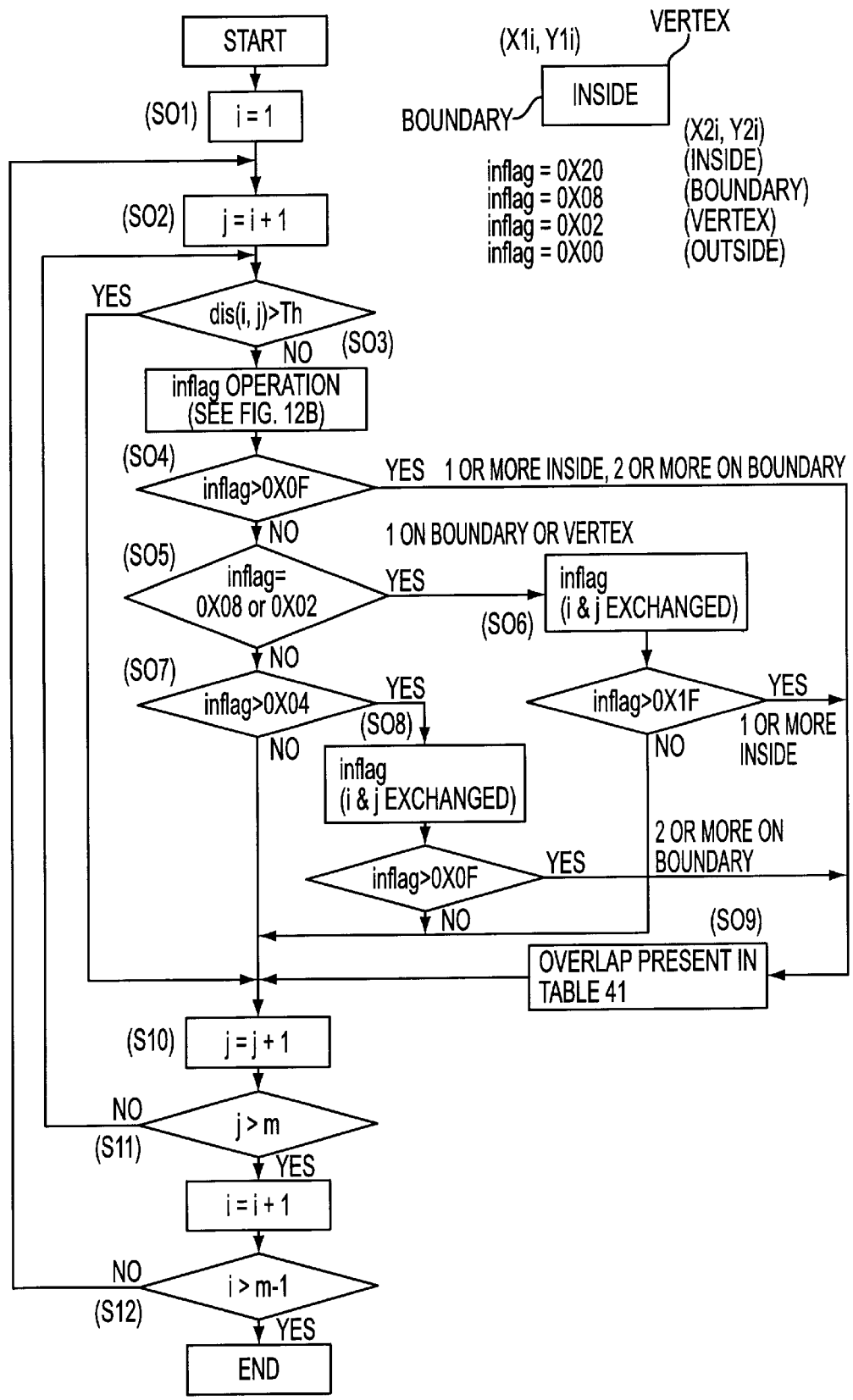
FIG. 13 is a flowchart illustrating another overlap determination method.

When the maximum size of the label image is known, as in a character pattern in a character stream, for example, a method shown in FIG. 13 can speed up the above overlap determination. FIG. 13 has processing for determining the distance between rectangles i and j inserted between steps S2 and S3 in FIG. 11.

dis(i,j) indicates the distance between rectangles i and j. Th indicates a value previously set in consideration of the maximum rectangle size. When the dis(i,j) is equal to the value Th or less, there is a possibility of two rectangles overlapping and therefore, the overlap determination is conducted. When the dis(i,j) is larger than the value Th, there is no possibility of two rectangles overlapping and therefore, the overlap determination is omitted to proceed to the following ones, thus speeding up the overlap determination. Distance dis(i,j) between two rectangles and the value Th can be defined by the expression shown in FIG. 12C, for example. The right member of dis(i,j) represents the larger of the two absolute values in the parenthesis. β is a coefficient of the maximum rectangle size.

Therefore, the present invention can provide an economical and high-speed method and apparatus for extracting a connected element.

Figure 14:
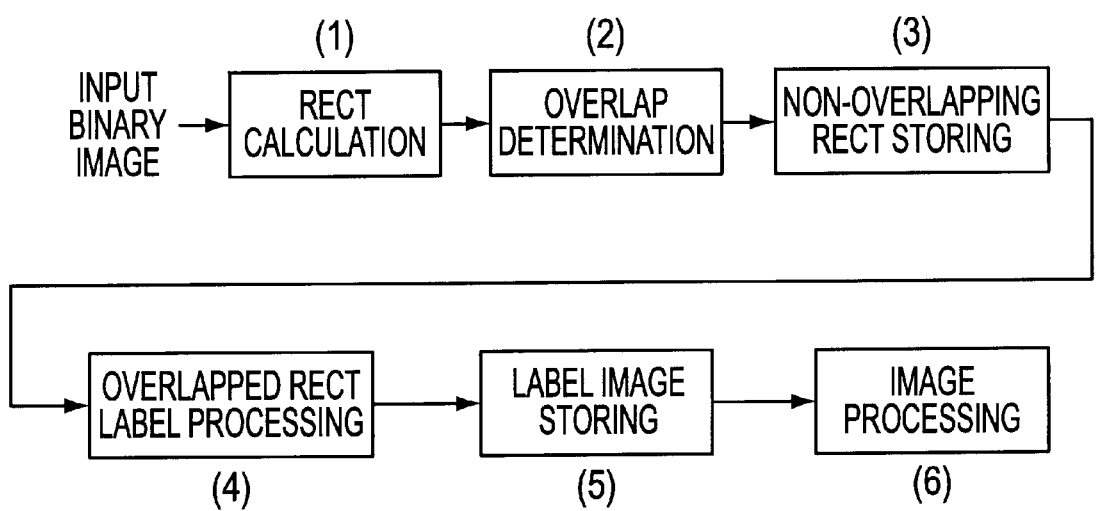
FIG. 14 is a conceptual diagram illustrating the second embodiment.

Next, the second embodiment of the present invention is explained. FIG. 14 is a conceptual diagram illustrating the second embodiment of the present invention. In the aforesaid first embodiment (see FIGS. 2 and 3), the label image is prepared first to check rectangles for overlapping and thereafter the label image data for the overlapping rectangles is compressed. Therefore, the label image work area 21 is needed. The second embodiment aims at reducing the storage capacity of the work area 21.

Referring to FIG. 14, the second embodiment is outlined, which (1) calculates a rectangle circumscribing a connected element (simply called a rectangle);
(2) determines whether a rectangle overlaps with others;
(3) stores the label and coordinates of the rectangle of a non-overlapping rectangle;
(4) extracts an overlapping rectangle from the input binary image data and performs the label processing thereon to calculate a label image; and
(5) stores the label image data of the overlapping rectangle, thus allowing the second embodiment to obtain the same results as the first embodiment, requiring less storage capacity of the work area 21.

Thereafter, image processing (e.g., image analysis and document image processing) is conducted by using thus-stored data.

Figure 15:
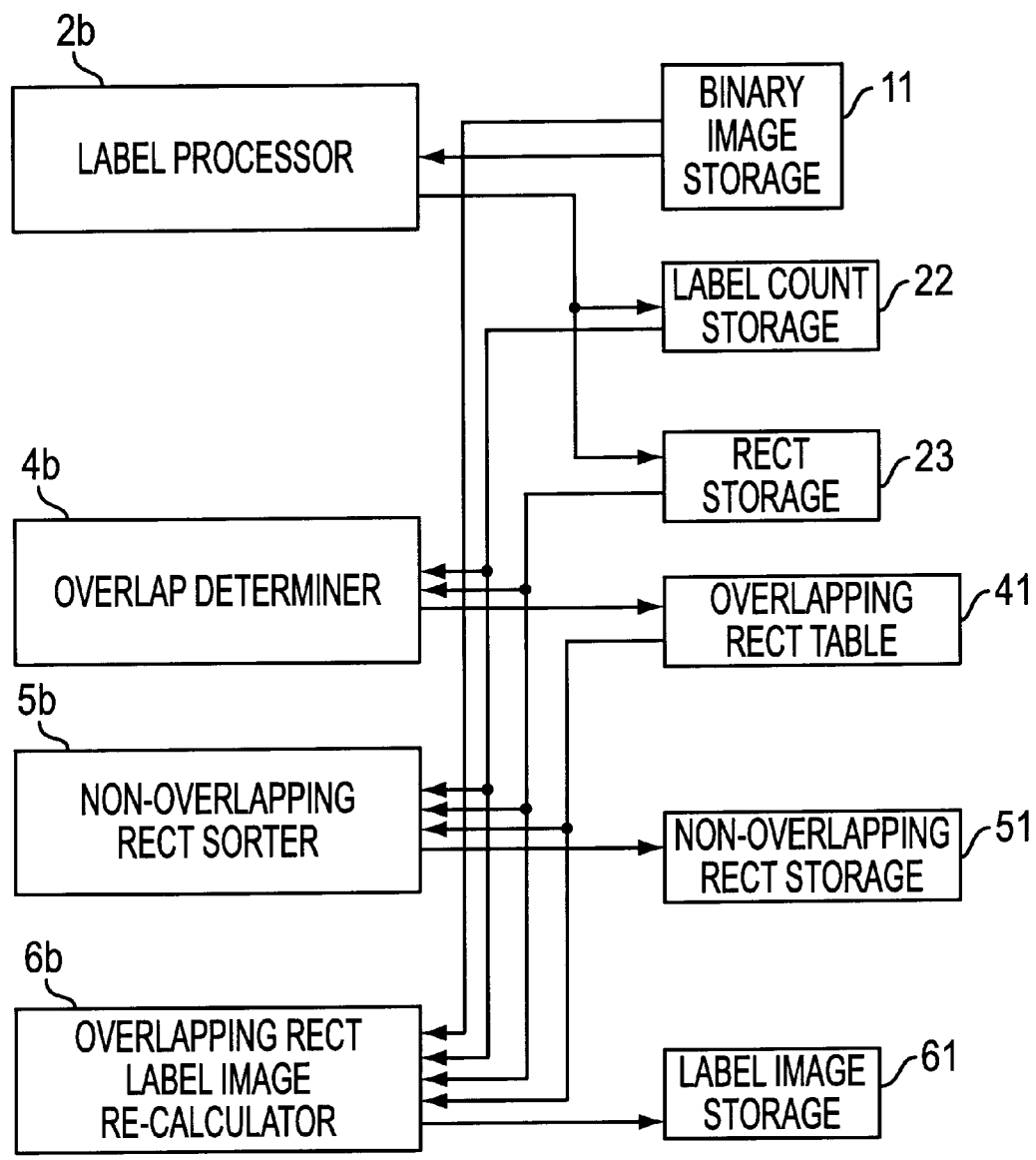
FIG. 15 is a block diagram illustrating the second embodiment.

FIG. 15 is a block diagram illustrating the second embodiment. As seen from FIG. 15, the second embodiment does not require the work area 21 shown in FIG. 3, which the first embodiment needed. That is, a label processor 2b calculates only the number of labels and rectangles, and stores them in the label count storage 22 and the rectangle storage area 23, respectively.

An overlap determiner 4b and a non-overlapping rectangle storer 5b perform the same processing as their equivalents in the first embodiment shown in FIG. 3. Thereafter, an overlapping rectangle label image re-calculator 6b first calculates a binary image of an overlapping rectangle (named α) using the data stored in the binary image storage 11, the rectangle storage 23 and the overlapping rectangle table 41. It then performs the label processing on the above-calculated binary image data again to further calculate a label image and rectangles circumscribing connected elements (or labels) within the overlapping rectangle.

Since there may be a label not concerned included, the overlapping rectangle label image re-calculator 6b selects as the label image 2 (see FIG. 10), only the label image of the rectangle that agrees to the rectangle α out of the re-calculated rectangles. Thus, the work area 21 can be spared by storing the label image 2 as shown in FIG. 10.

Therefore, the present invention can provide an economical and high-speed method and apparatus for extracting a connected element.

Figure 16:
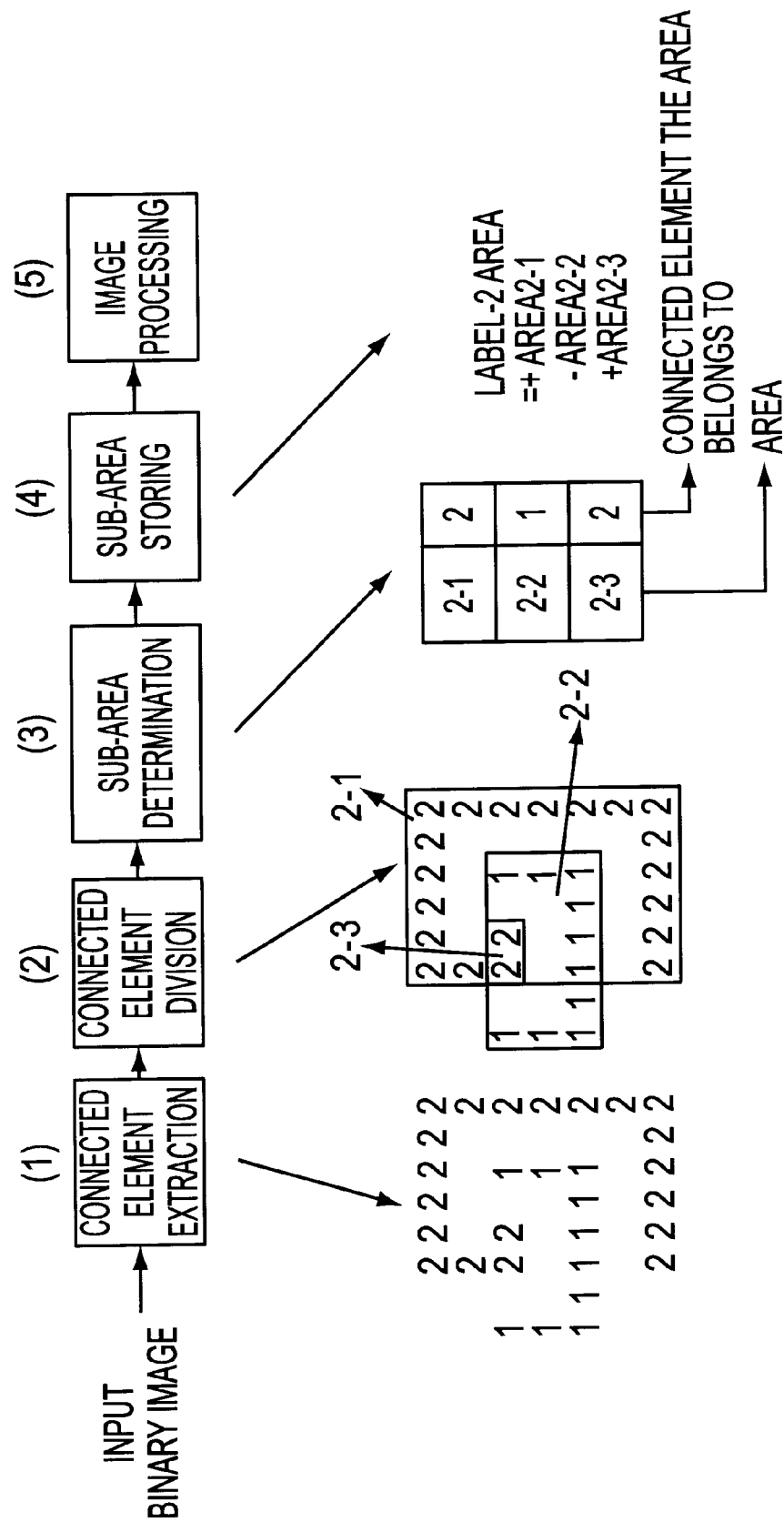
FIG. 16 is a diagram illustrating the principle of the third to fifth embodiment.

FIG. 16 is a schematic diagram illustrating the principle of the third embodiment of the present invention, which (1) extracts a connected element from the input binary image;
(2) when the connected element includes another, further divides the connected element (2-1) into areas (2-2 and 2-3) according to the label;
(3) determines to which connected element each area belongs, based on the label; and
(4) expresses the connected element in an arithmetic representation (e.g., addition and subtraction) in terms of the areas and stores the so-expressed connected element information.

Thereafter, the image processing is performed on the connected element information by the image processing unit (not shown).

In summary, the third embodiment divides a connected element which overlaps with others, into areas according to the label, and expresses the connected element in an arithmetic representation in terms of the areas, accordingly allowing a decrease in storage capacity for storing the label image of the picture.

Figure 17:
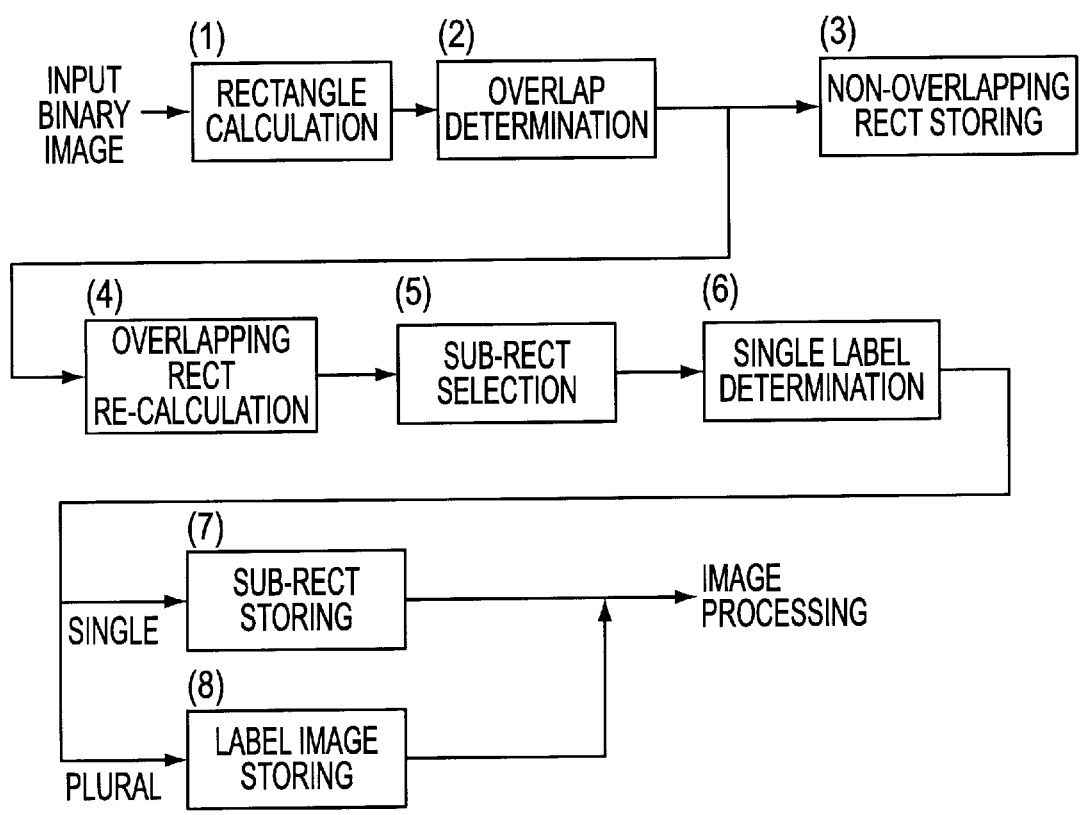
FIG. 17 is a flowchart illustrating an outline of the third embodiment.

FIG. 17 is a flowchart illustrating an outline of the third embodiment of the present invention, which (1) performs the label processing on the input binary image data using the aforesaid "Label Processing Method", for example and calculates a rectangle circumscribing a connected element according to the label;
(2) determines whether the rectangle overlap with others;
(3) stores the label and coordinates of a non-overlapping rectangle;
(4) re-calculates rectangles included in an overlapping rectangle (called a rectangle concerned), according to the labels;

(5) selects a rectangle (called a sub-rectangle) having a size differing from that of the rectangle concerned, from the above re-calculated rectangles;

(6) determines whether connected elements included in the sub-rectangle share one single label, or more definitely, re-calculates rectangles included in the sub-rectangle and determines whether the rectangle concerned includes a single label according to the number of rectangles included in the sub-rectangle;

(7) if one single label is shared, stores the sub-rectangles as belonging to the rectangle concerned, for use in reproducing the label image (the actual area of the overlapping connected element is obtained by excluding the sub-rectangles from the rectangle concerned);

(8) unless one single label is shared, i.e., unless any one of the sub-rectangles has a label differing from that of the rectangle concerned, stores the label image of the rectangle concerned. The label image is generated by performing the label processing on the image included in the rectangle concerned. However, it may be generated simultaneously when rectangles included in the rectangle concerned are re-calculated in the above step (4).

Thus, the third embodiment of the present invention outputs the connected elements in a combination of the rectangles and the label images to the image processing unit, which performs the image processing using the input rectangles and the label images.

Figure 18:
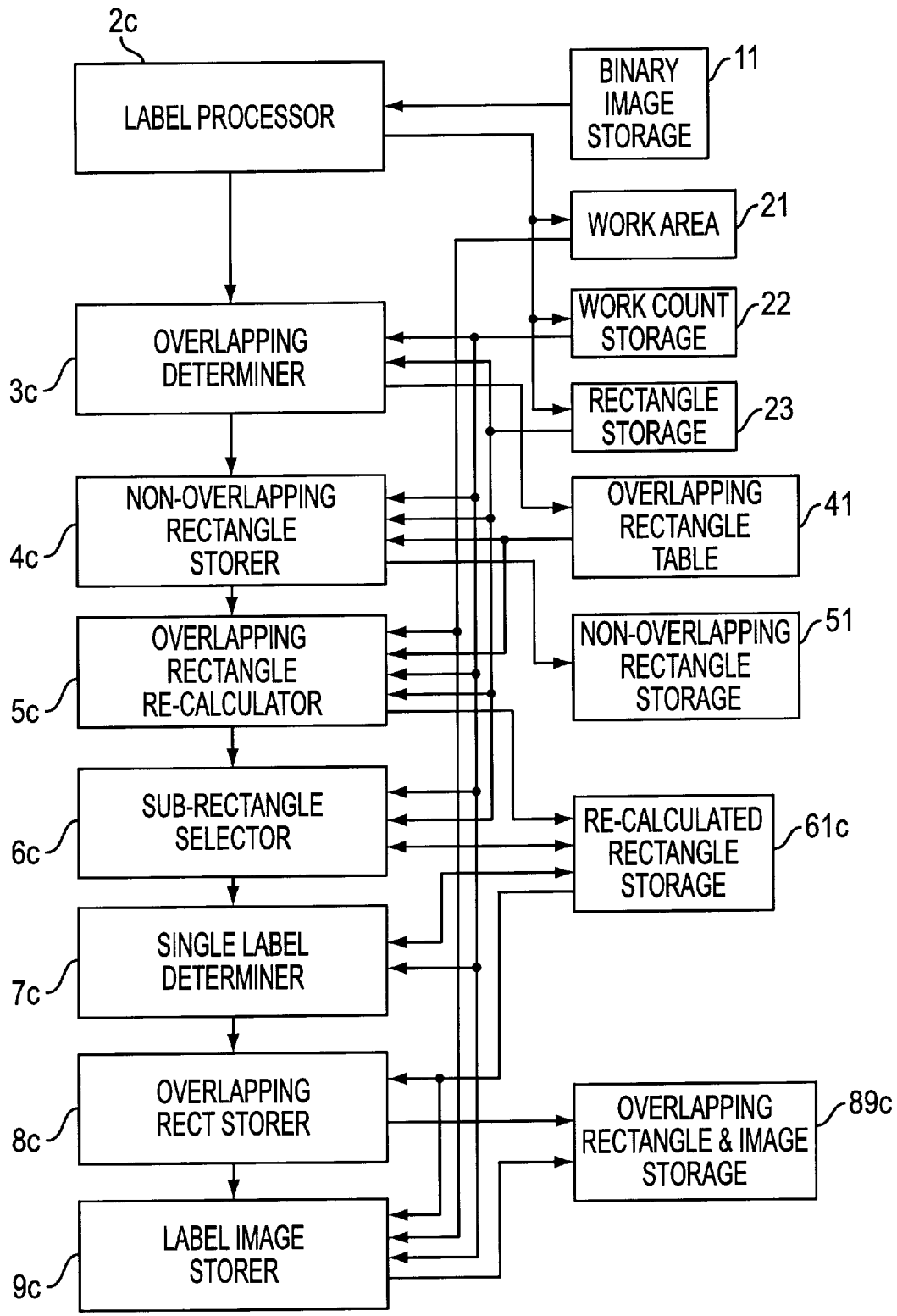
FIG. 18 is a block diagram illustrating the third embodiment.

FIG. 18 is a block diagram illustrating the third embodiment of the present invention.

A label processor 2c performs the label processing using the aforesaid method, for example. FIGS. 4–6 show examples of the processing results. An overlap determiner determines whether a rectangle overlaps with others, i.e., it determines whether a rectangle concerned includes a vertex of another one according to FIG. 11 and stores the determination results in the overlapping rectangle table 41. The non-overlapping rectangle storer 5c selects non-overlapping rectangles from the overlapping rectangle table 41 and stores the rectangles in the non-overlapping rectangle storage 51 (for detail, see FIG. 8).

Figure 20:
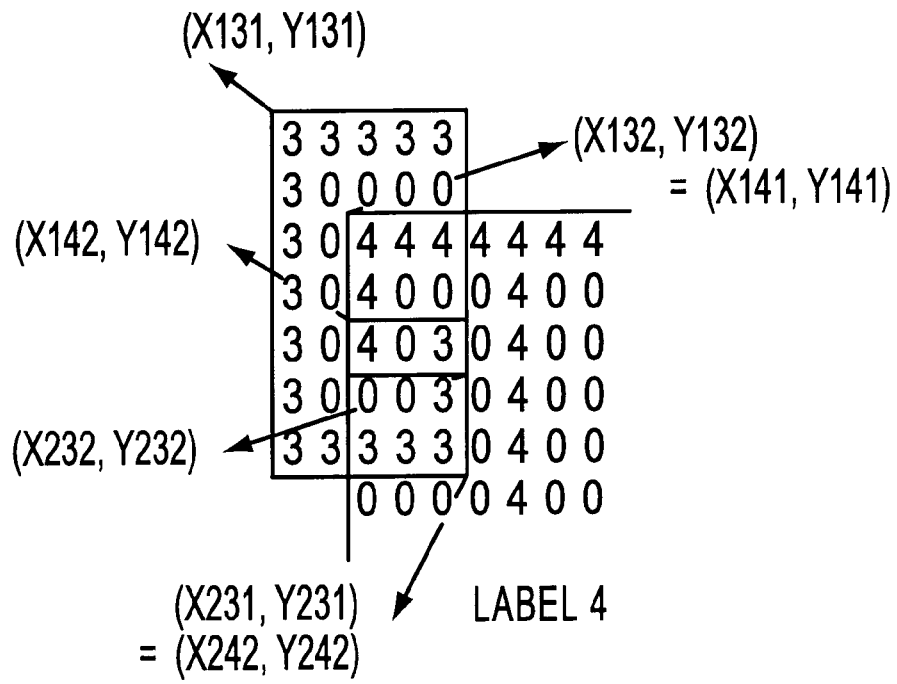
FIG. 20 is a diagram exemplifying an overlapped area having plural labels.

An overlapping rectangle re-calculator 5c re-calculates rectangles included in the overlapping rectangle according to the labels and stores the re-calculated rectangles in a re-calculated rectangle storage 61c as shown in FIG. 19. For example, for a label 3 shown in FIG. 20 as the label concerned, it stores a rectangle having top-left/bottom-right coordinates (X131,Y131)/(X231,Y231) and one having coordinates (X132,Y132)/(X232,Y232).

A sub-rectangle calculator 6c retrieves a rectangle having the label concerned (called label-concerned rectangle) from the rectangle storage 23 and compares the rectangle with the rectangles stored in recalculated rectangle storage 51c. When they disagree, it stores "no" in the "label concerned" area of FIG. 19 to indicate that the latter is a sub-rectangle. For the label 3 in the example of FIG. 20, "no" is stored for the rectangle having coordinates (X132,Y132)/(X232, Y232).

Figure 21:
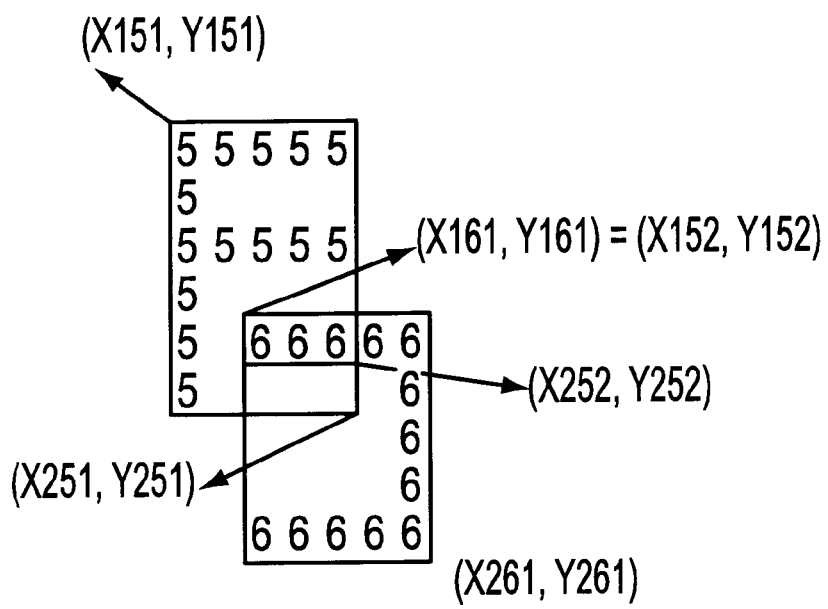
FIG. 21 is a diagram exemplifying an overlapped area having a sigle label.

A single label determiner 7c calculates rectangles included in the sub-rectangle and if there is only one rectangle included, stores "yes" in the "single label" area of FIG. 19. As for the label 3 in FIG. 2, "no" is stored for the rectangle having coordinates (X132,Y132) /(X232,Y232), because the sub-rectangle includes labels 3 and 2. As for the label 5 in FIG. 21 example, "yes" is stored for the sub-rectangle having coordinates (X152,Y152)/(X252,Y252), because the sub-rectangle includes one single label 6.

An overlapping rectangle storer 8c stores the overlapping rectangle (see FIG. 22) and also the sub-rectangle having "yes" stored in the "single label" area of FIG. 19, into an overlapping rectangle & label image storage 89c.

Figures 22, 23:
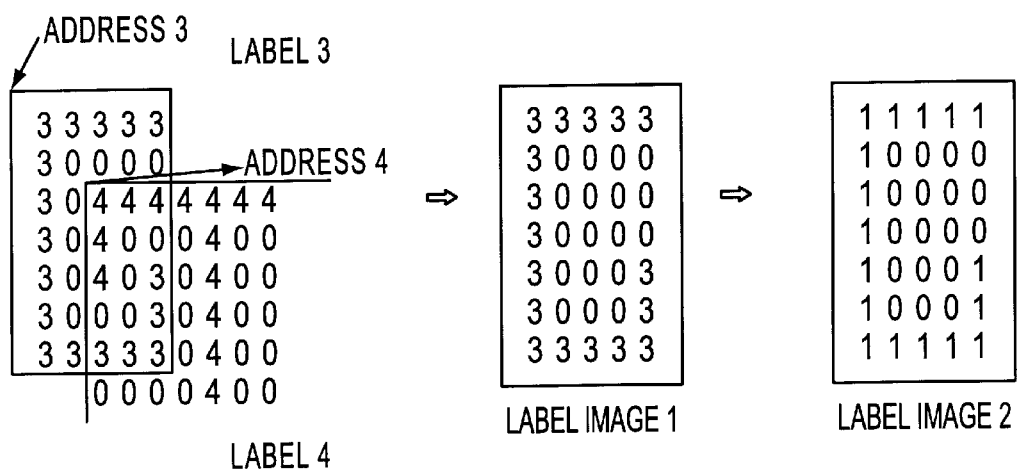
FIG. 22 is a diagram illustrating overlapping rectangle storage of the third embodiment.
FIG. 23 is a diagram illustrating a label image of an overlapping rectangle.

A label image storer 8c stores in the overlapping rectangle & label image storage 89c, the label image (see FIG. 23) of the label-concerned rectangle having "no" stored in the "single label" area of FIG. 19 and also the starting address of storage area where the label image is stored (see FIG. 23).

The label image of an overlapping rectangle can be obtained by cutting out the label image from the work area 21 with the overlapping rectangle shown in FIG. 9 and by setting a label unconcerned to 0 as shown in label image 1 of FIG. 23. For data compression to reduce the data amount required for storing the label image, the label image may be stored with the label concerned set to 1 and others set to 0 as shown in label image 2 of FIG. 23.

After completion of the aforesaid processing, only the data shown in FIGS. 5, 8, 22 and 23 (and also the binary image data) is output to the image processing unit (not shown).

Therefore, the image processing unit can reproduce the label image of the entire picture based on the data input. The label image of the non-overlapping rectangle can be reproduced by cutting out the binary image with the non-overlapping rectangle having the "coordinates" shown in FIG. 8 and by replacing "1"s with the label numbers concerned. The label image of the overlapping rectangle which has none stored both in the "starting address" and "single-label rectangle" areas (see FIG. 22), can be reproduced in the same way as with the non-overlapping rectangle.

The label image of the overlapping rectangle which has the coordinates stored in the "single-label rectangle" area, can be reproduced by executing the same reproduction process as for the non-overlapping rectangle and then by setting the label number of the single-label sub-rectangle (see FIG. 22) to 0. The label image of the overlapping rectangle which has an address stored in the "starting address" area (see FIG. 22), can be reproduced based on the coordinates stored in the "overlapping rectangle" area (see FIG. 22) and the label image 1 (see FIG. 23) stored in the area designate by the "address". When the label image data of the overlapping rectangle is compressed as shown in the label image 2 of FIG. 23, the label image can be reproduced by replacing "1"s with the label numbers of the label image concerned.

Figure 24:
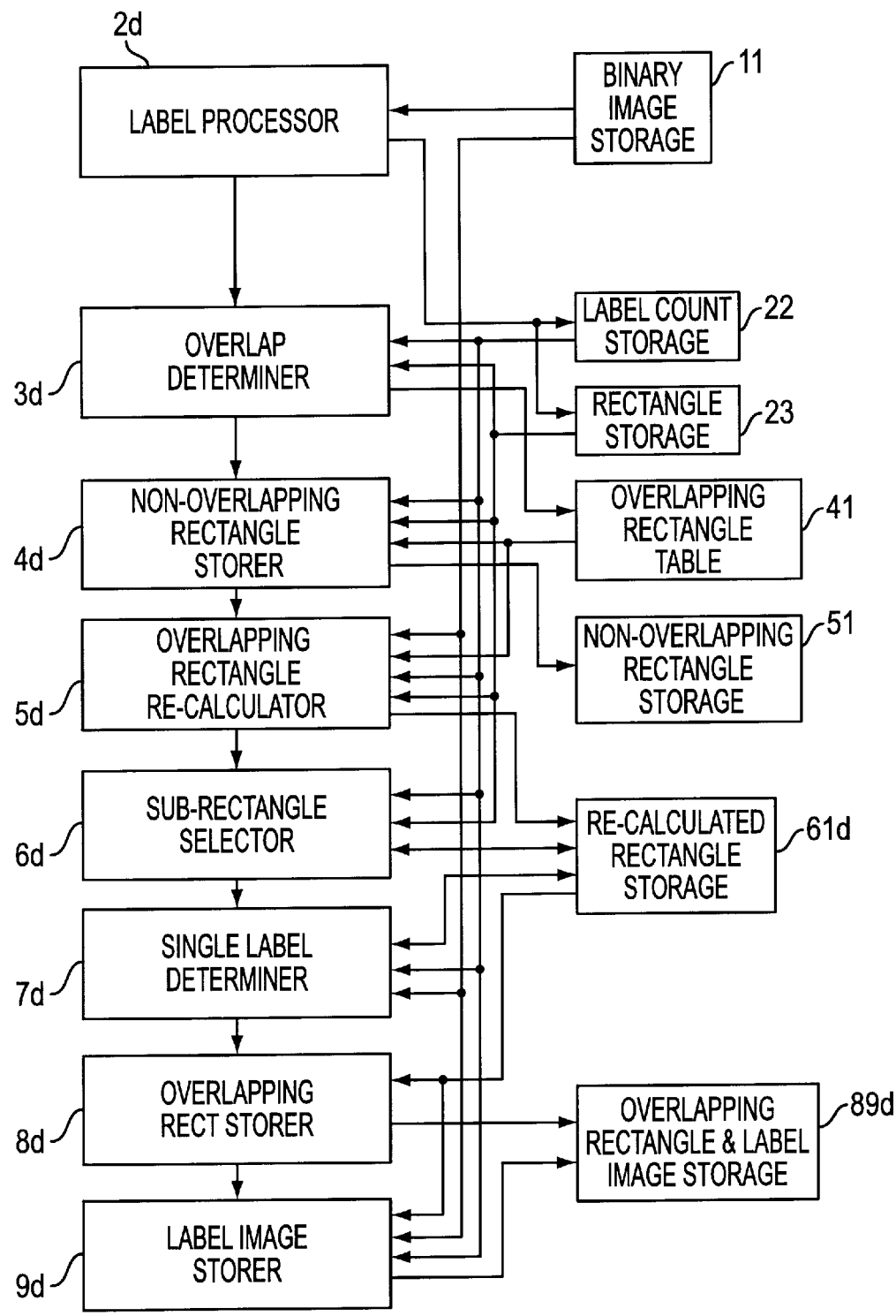
FIG. 24 is a block diagram illustrating the fourth embodiment.

Next, the fourth embodiment of the present invention is explained. FIG. 24 is a block diagram illustrating the fourth embodiment of the present invention.

In the aforesaid third embodiment (see FIG. 18), the label image is generated first to check the rectangles for overlapping and thereafter the label image data for the overlapping rectangles is compressed. Therefore, the label image work area 21 is needed. The fourth embodiment aims at reducing the storage capacity of the work area 21. The fourth embodiment is explained, referring to FIG. 24.

There is no work area 21 shown in FIG. 24, which the third embodiment required (see FIG. 18). A label processor 2d calculates only the number of labels and rectangles, and stores them in the label count storage 22 and the rectangle storage 23, respectively. System components 3d–8d shown in FIG. 24 sequentially perform the processing similarly to their equivalents shown in FIG. 18 of the third embodiment.

An image storer 9c first prepares a binary image within the overlapping rectangle (named α) by using the data stored in the binary image storage 11, the rectangle storage area 23 and the overlapping rectangle table 41. It then performs the label processing on the above-prepared binary image data to further calculate label images and rectangles, and selects only the label image of the rectangle that agrees in size to the rectangle α because there may be a label unconcerned included. It stores the selected label image as the label image 2 (see FIG. 23).

Thus, the fourth embodiment can spare the work area 21 by storing the label image 2 (see FIG. 23) in the overlapping rectangle & label image storage 89d (see FIG. 22), instead of storing the label image in the work area 21 as in the third embodiment. Accordingly, the fourth embodiment can attain the same result as the third embodiment, decreasing the storage amount required for the work area 21.

Figure 25:
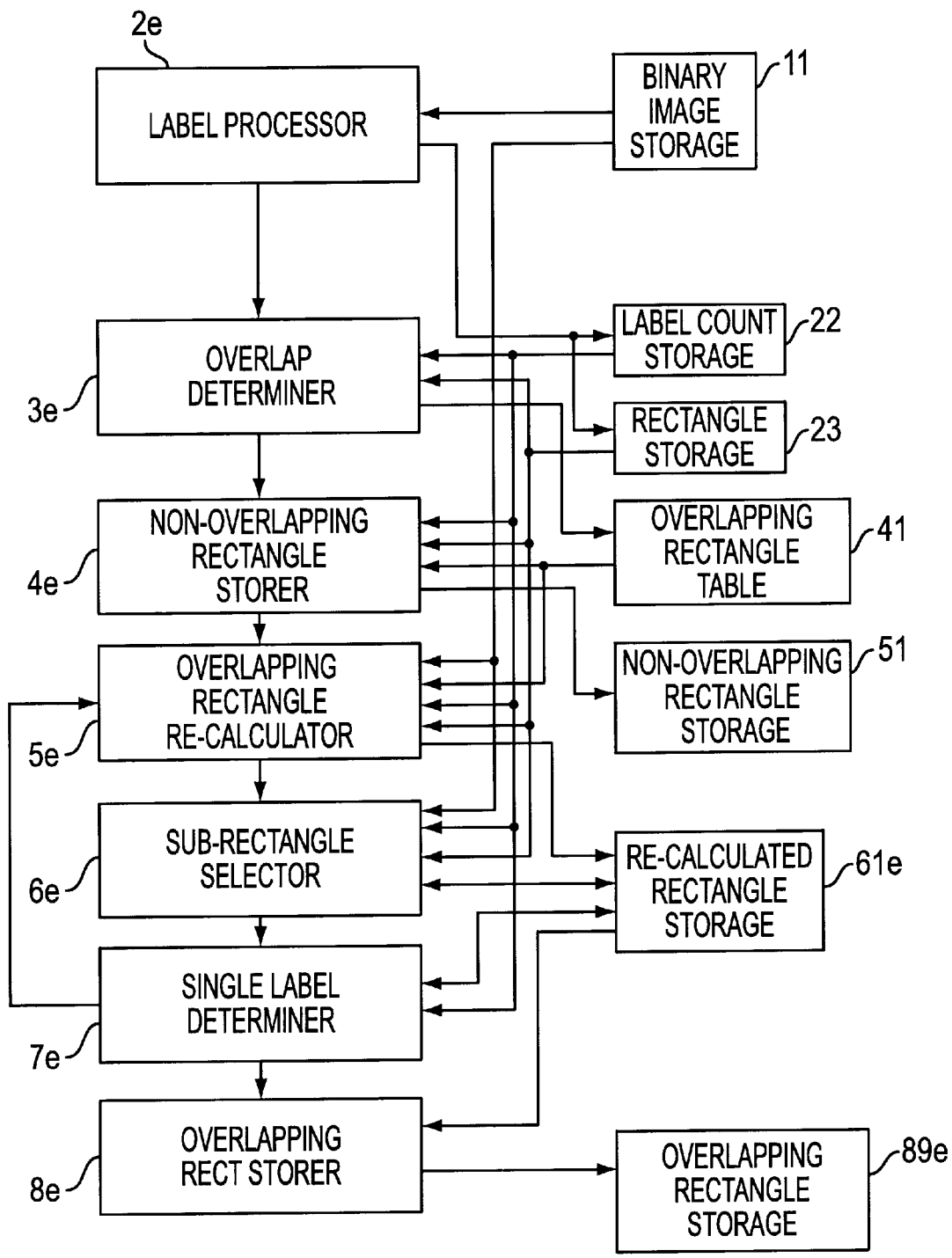
FIG. 25 is a block diagram illustrating the fifth embodiment of the present invention.

Next, the fifth embodiment of the present invention is explained. FIG. 25 is a block diagram illustrating the fifth embodiment of the present invention.

In the foregoing third and fourth embodiment, an overlapping rectangle is expressed in the arithmetic representation or in a label image depending on whether an overlapping rectangle includes a single label unconcerned or plural labels unconcerned. To further reduce the data amount required for label images, the fifth embodiment repeats the aforesaid process of dividing a rectangle until a label unconcerned included therein comes to be single. That is, after completion of the same processing by system components 2e–4e as described in the fourth embodiment, the overlapping rectangle re-calculator 5e, sub-rectangle selector 6e and single label determiner 7e perform the aforesaid process of dividing a rectangle concerned repeatedly until a label unconcerned included therein comes to be single and store the resulting sub-rectangles into a re-calculated rectangle storage 61e.

Figure 28:
FIG. 28 is a diagram illustrating overlapping rectangle storage of the fifth embodiment.

FIGS. 26–28 show examples of the processing results. First, as shown in FIG. 26, the processing to divide a label-concerned rectangle into sub-rectangles is repeated until a resulting sub-rectangle includes one single label. That is, a label-concerned rectangle, which is named as a parent, is divided hierarchically into a child 1 and further into child 2. The attribute 1 is a label of the first rectangle at a hierarchical level of child 1; the attribute 1-1 is a label of the first rectangle included in the child-1 rectangle (or at a hierarchical level of child 2).

An overlapping rectangle storer 8e determines whether the labels of the sub-rectangles stored in the re-calculated rectangle storage 61e are the label concerned and stores the determination results in an overlapping rectangle storage 89e (for details, see FIG. 28). That is, it gives an operator "+" to a sub-rectangle having the label concerned and an attribute "−" to one having a label unconcerned. Sub-rectangles at a hierarchical level of child-1 are naturally given an operator "−".

The above determination is made by performing the label processing on the label-concerned rectangle to calculate the label image and then by determining whether the label of the child rectangle matches that of the parent rectangle. The label image of an overlapped area of a particular label can be reproduced first by determining the area using the equation shown in FIG. 28 and then by replacing pixels having value 1 in the binary image with the label number. For example, the area of label 9 in FIG. 28 can be determined by adding or subtracting rectangles according to the operator in the order of rectangle, parent, child 1, child 2 and so on.

However, when an overlapped area to be divided is large in size or includes many labels, the work area for temporarily storing the label image of the area requires a large amount of storage capacity. The problem is solved by dividing the overlapped area and generating the label image of a divided area. In the above example of FIG. 28, the label image of the parent rectangle is generated first and then it is determined whether the label of each child rectangle agrees to that of the parent rectangle. Instead, the determination may be made based on the label image of a sub-area cut off of the parent rectangle. If the vertical length of the parent rectangle is longer than the horizontal width, it is cut horizontally into sub-areas for example, as in FIG. 29A so that the sub-area includes the sub-rectangle whose operator is to be calculated. Then, the label processing is performed on the sub-area to generate a label image.

Figures 29A, 29B:
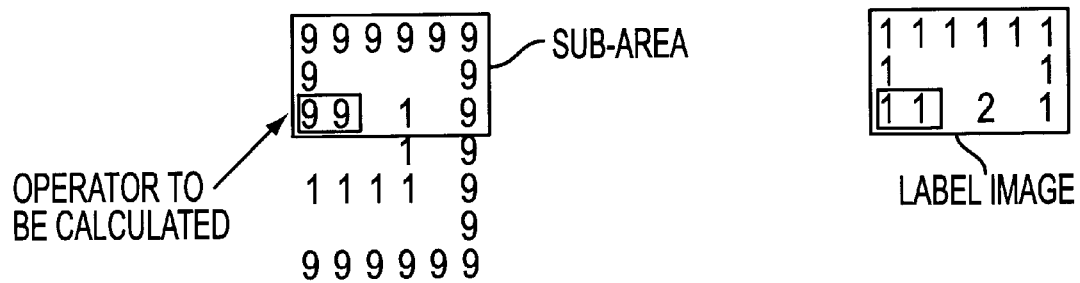
FIGS. 29A and 29B show a sub-area and its label image, respectively.

The label of a rectangle having the same size in the label image as the sub-area is the label concerned. Thus, the label image can be generated by using a decreased capacity of work area as shown in FIG. 29B.

As described above, the area concerned is divided horizontally or vertically depending on whether the vertical length of the area is longer or shorter than the horizontal width. The sub-area is set such that it includes the rectangle whose operator is to be determined. Thus, the label image can be generated by expanding the sub-area until a rectangle having the same size as the sub-area is obtained.

Figure 30:
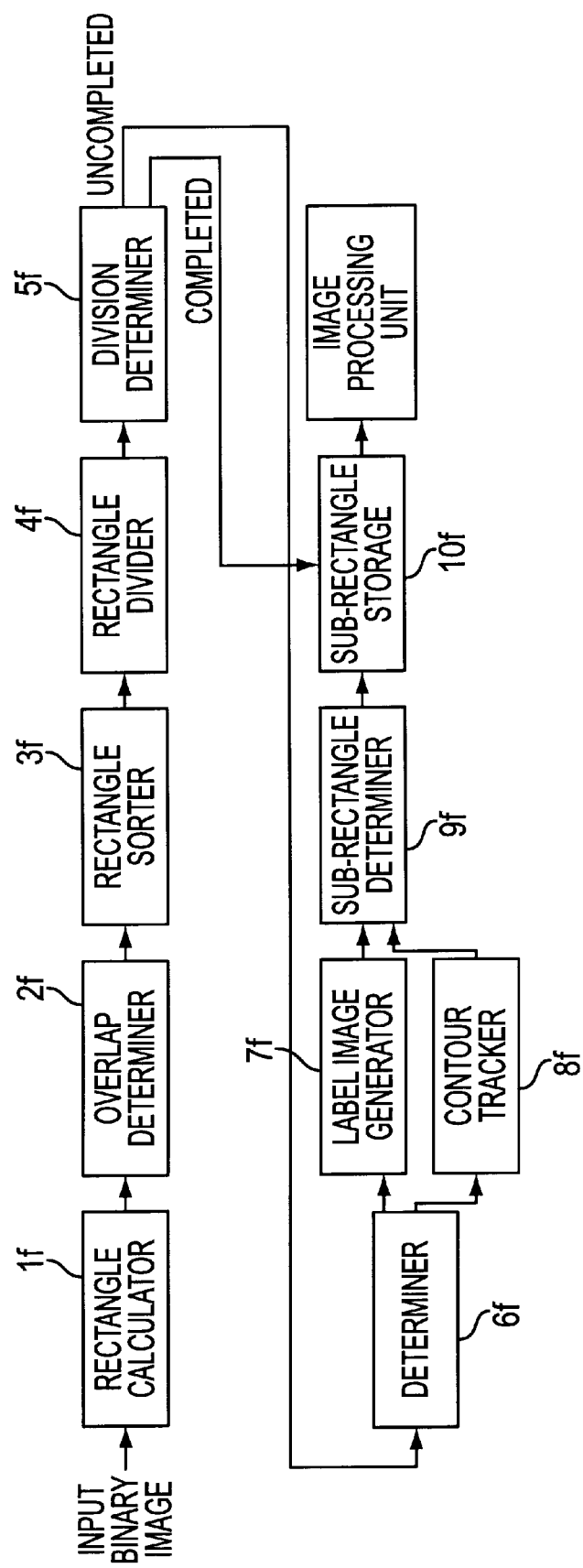
FIG. 30 is a conceptual diagram illustrating the sixth embodiment.

Next, the sixth embodiment of the present invention is explained. FIG. 30 is a conceptual diagram illustrating the sixth embodiment of the present invention. The functions of the connected element extraction device, whose configuration is shown in FIG. 40, are achieved by the program stored in the program memory 111 and executed by the CPU 110.

Based on the binary image data stored in the work memory 113, a rectangle calculator 1f calculates a rectangle circumscribing a connected element (e.g., A1 in FIG. 39A) (hereinafter simply called a rectangle) or more particularly top-left and bottom-right coordinates of the rectangle as shown in FIG. 39D. An overlap determiner 2f determines whether a rectangle calculated by the rectangle calculator if overlaps with others stores their top-left and bottom-right coordinates of non-overlapping rectangles.

A rectangle sorter 3f calculates the sizes of the respective overlapping rectangles and sorts them in an ascending order of the size. The rectangle divider 4f selects an overlapping rectangle, one by one, in the order of smaller size and divides the overlapped area where the overlapping rectangle (called a parent rectangle) overlaps with an overlapped rectangle, into sub-rectangles (called a child rectangle) which do not overlap with each other.

A division determiner 5f determines whether the sub-rectangles have already been processed and for a sub-rectangle already processed, assumes the sub-rectangle stored in the sub-rectangle storage 10f to be newly processed; for a sub-rectangle not yet processed, passes it to a size determiner 6f.

The size determiner 6f calculates the size of the passed sub-rectangle and determines whether the storage capacity of the work memory 113 is enough for a label image of the sub-rectangle. If it is enough, the label image generator 7f generates the label image of the sub-rectangle.

A sub-rectangle determiner 9f determines whether the label of the sub-rectangle (called a child label) matches that of the overlapping rectangle concerned (called a parent label). Depending on a match/mismatch, the connected element having the parent label is represented by an addition/subtraction of the child rectangle to/from the parent rectangle concerned. Unless the storage capacity is enough, a contour tracker 8f conducts contour tracking on the child rectangle starting at its outermost pixel. The contour tracker 8f calculates the maximum and minimum of the tracking coordinates and obtains the label image of a rectangle corresponding to the sub-rectangle.

A sub-rectangle determiner 9f determines whether the child label of the sub-rectangle matches or mismatches the parent label concerned and depending on a match/mismatch, expresses the connected element of the parent label in an addition/subtraction of the child rectangle to/from the parent rectangle concerned. It then stores the expression in sub-rectangle storage 10f provided in the work memory 113.

In an image exemplified in FIG. 39A, the rectangle having label 1 (called label-1 rectangle), which corresponds to the connected element A1, is first selected and processed because it is smaller in size than the label-2 rectangle, which corresponds to the connected element A2, as shown in FIG. 39C. Therefore, the overlapped area 2-2 shared by the connected elements A1 and A2 is handled when the connected element A1 is processed. Accordingly, when the connected element A2 is processed, it is not necessary to generate the label image in order to determine whether the sub-rectangle 2-2 belongs to the connected element A2, because it is known in the previous processing that the sub-rectangle 2-2 belongs to the connected element A1.

To increase the processing speed, the connected image element A2 may be expressed as follows, by expressing the overlapped area 2-2 in terms of the sub-rectangles (1-1) and (1-2) which was used to express the connected element A1.

$$A2=+(2-1)-(1-1)+(1-2)$$

To represent the connected element A1 of the image shown in FIG. 39A, it need not generate the label image, but need only calculate a rectangle circumscribing the connected element A1, because the rectangle (1-1) is divided into only one sub-rectangle (1-2) and because the sub-rectangle (1-2) includes one single label.

When the label processing is performed on a more complicated image as shown in FIG. 31A, connected elements A1 and A2 having respective pixels 1 and 2 are obtained. In this case, to determine which of the connected elements the overlapped area shared by the connected elements A1 and A2 belongs to, it need only generate a label image of the rectangle circumscribing the connected element A1 which is smaller in size. To determine whether the sub-rectangle (1-3) belongs to the connected element A1, a label image of the rectangle circumscribing the connected element A1 is generated. If the rectangle circumscribing the connected element A1 is too large in size for the work memory 113 to store its label image, the contour tracking is conducted on the sub-rectangle (1-3) for example, starting with the outermost pixel. As a result, it is recognized that the sub-rectangle (1-3) belongs to the connected element A1.

Figure 32:
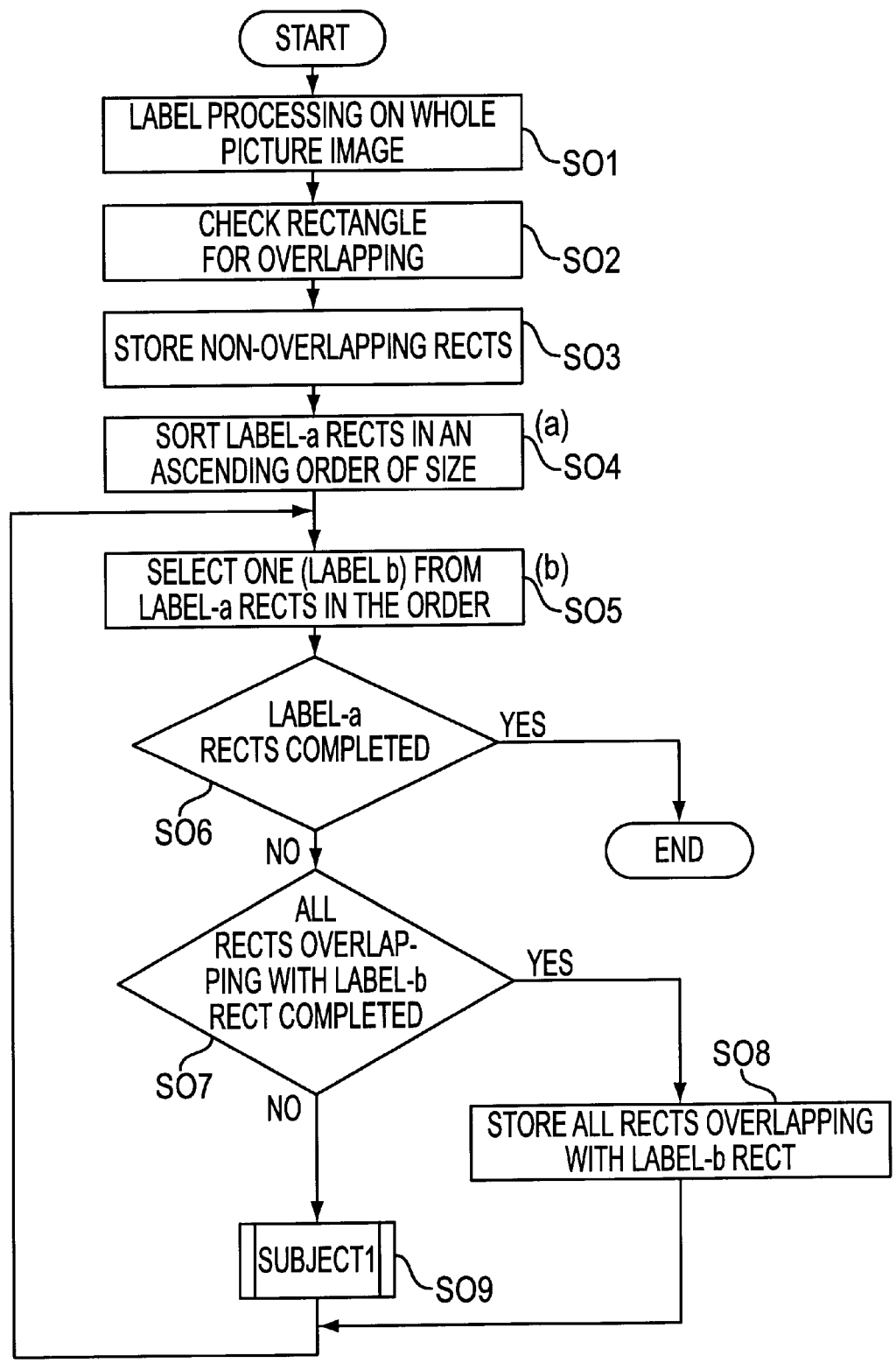
FIGS. 32–35 are flowcharts illustrating the sixth embodiment.

The sixth embodiment of the present invention is explained in more detail, referring to the flowchart of FIGS. 32–35, where processing is performed by repeating SUBJECT 1 and SUBJECT 2 subroutines:

(S01) In FIG. 32, the binary image data is copied from the image memory 112 to the work memory 113. The label processing is performed on the whole binary image data in the work memory 113 to calculate rectangles circumscribing the connected elements (pixels). In the example shown in FIG. 4, m rectangles are calculated and each defined by top-left (x1i,y1i) and bottom-right (x2i,y2i) coordinates (i–1, 2, . . . , m). The number of labels or rectangles (m) obtained through the label processing is stored in storage area within the work memory 113. The label and coordinates of each rectangle are stored in a rectangle storage area within the work memory 113, as shown in FIG. 6.

(S02) Based on the coordinate data stored in the rectangle storage area, each of the rectangles is checked for overlapping with others and the check results are stored in a rectangle overlap table as show in FIG. 7, where the rectangles having respective label 3 and label 4 (i.e., label-3 rectangle and label-4 rectangle); label-5 rectangle and label-6 rectangle are shown as overlapping with each other.

(S03) Rectangles which do not overlap with others (non-overlapping rectangles) are stored in a non-overlapping rectangle storage within the work memory 113, as shown in FIG. 8, where those having labels 1, 2, . . . , m are stored.

(S04) The sizes of the respective overlapping rectangles (shown as overlapping "present" in FIG. 7) are calculated using the coordinates stored in the rectangle storage (FIG. 6). The overlapping rectangles are sorted in an ascending order of the size and stored in a table as shown in FIG. 36. Note that a parenthesized alphabet (e.g., (a)) following the box represents a label or labels resulting from the execution of the step indicated in the box.

(S05) An overlapping rectangle having the smallest size is selected from the table shown in FIG. 36 and subjected to the SUBJECT 1. Here, the processing starts with the label-3 rectangle having the smallest size.

(S06) It is determined whether the SUBJECT 1 has been completed for all the label-a rectangles sorted in step S04.

(S07) It is determined whether the SUBJECT 1 has been completed for all the rectangles (i.e., overlapped rectangles) which the label-b rectangle selected in step S05 overlaps with.

(S08) If the determination in step S07 is "yes", all the overlapped rectangles' labels are stored in an area of the table in FIG. 36, corresponding to the label b.

Figure 33:
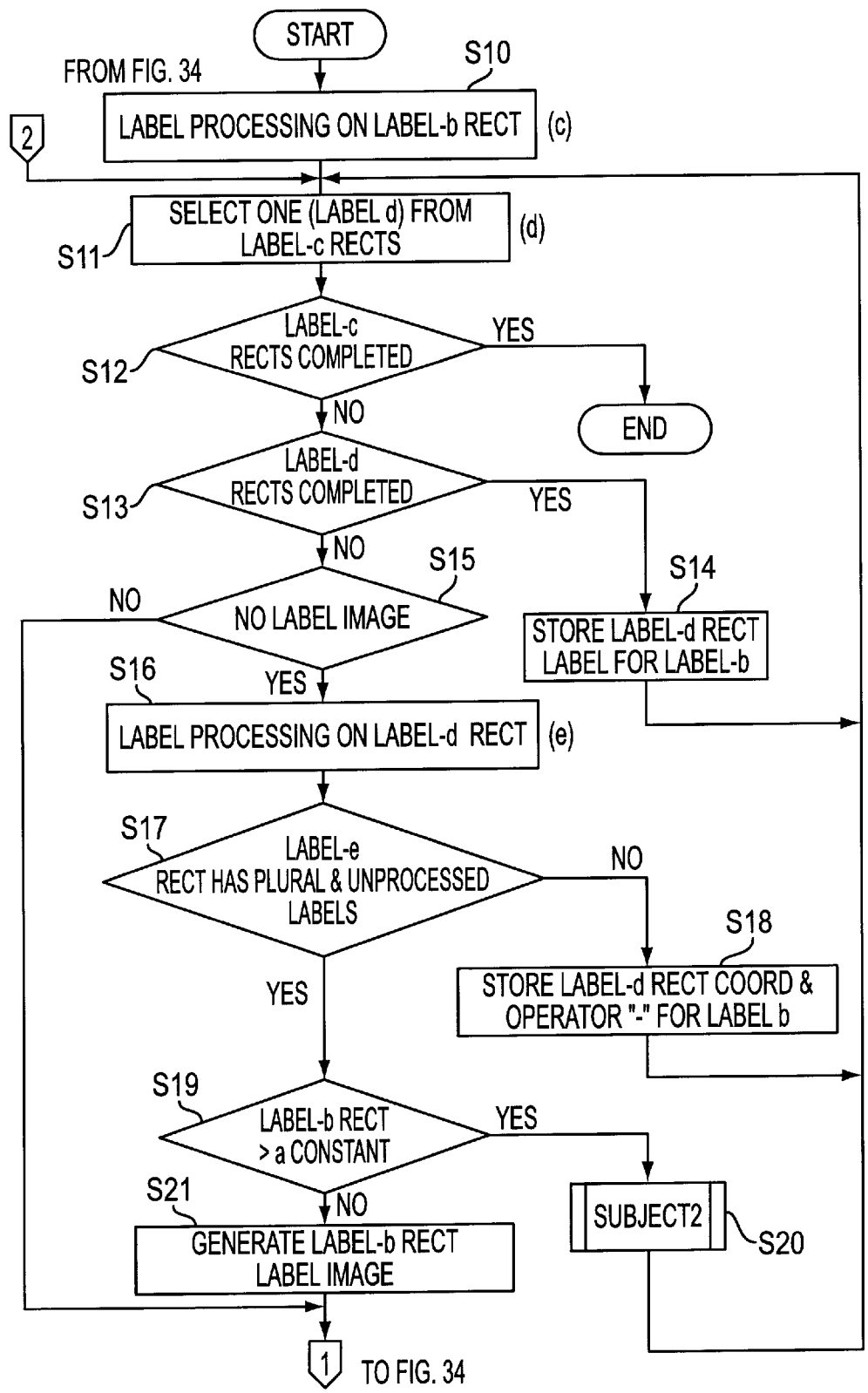

(S09) If the determination in step S07 is "no", the SUBJECT 1 is executed on the remaining rectangles according to the procedure shown in FIG. 33.

(S10) In FIG. 33, the label processing is performed on the label-b rectangles selected in step S05. The processing calculates a child rectangle circumscribing a connected element included in the parent rectangle, in the same way as in step S01. In the image shown in FIG. 31A, the label-1 rectangle, which has a smaller size of the label-1 and label-2 rectangles, is selected. The label processing is performed on the label-(1-1)- and label-(1-2) rectangles. Here, the label-(1-1) rectangle is the same as the label-1 parent rectangle.

(S11) A label-d rectangle is selected from the label-c rectangles obtained in step (S10). In the image shown in FIG. 31A, the label-(1-2) rectangle is selected from the label-(1-1) and label-(1-2) rectangles.

(S12) It is determined whether the SUBJECT 2 has been completed for all the label-c (e.g., label-(1-1) and label-(1-2)) rectangles obtained in step S10.

(S13) It is determined whether the SUBJECT 2 has been completed for the label-d (e.g., label-(1-2) rectangle) rectangle selected in step S11.

(S14) If the determination in step S13 is "yes", the label number of the label-d rectangle is stored in an area corresponding to the label b, of the table in FIG. 36.

(S15) If the determinations in steps S12 and S13 are both "no", it is determined whether the label image has already been generated for the label-b (e.g., A1 label-(1-1)) rectangle selected in step S05 for the SUBJECT 1 processing.

(S16) If the label image has not been generated yet, the label processing is performed on the label-d rectangle selected in step S11. In the example shown in FIG. 31B, the label processing is performed on the label-(1-2) rectangle and label-e (i.e., label-(1-2) and label-(1-3)) sub-rectangles are calculated.

(S17) It is determined whether the label-e sub-rectangles calculated in step S16 includes plural labels and a label not yet processed.

(S18) If the determination in step S17 is "no", the coordinates of the label-d rectangle selected in step S11 is stored in the "sub-rectangle" area of FIG. 37, corresponding to label b.

(S19) If the determination in step S17 is "yes", it is determined whether the size of the label-b rectangle selected in step S05 is larger than a pre-determined value. For example, the determination is made according to whether the storage capacity of the work memory 113 required for generating the label image of the label-b rectangle is larger than a predetermined storage amount (e.g., 64 k bytes).

(S20) If the determination in step S19 is "yes", the SUBJECT 2 is executed.

Figure 34:
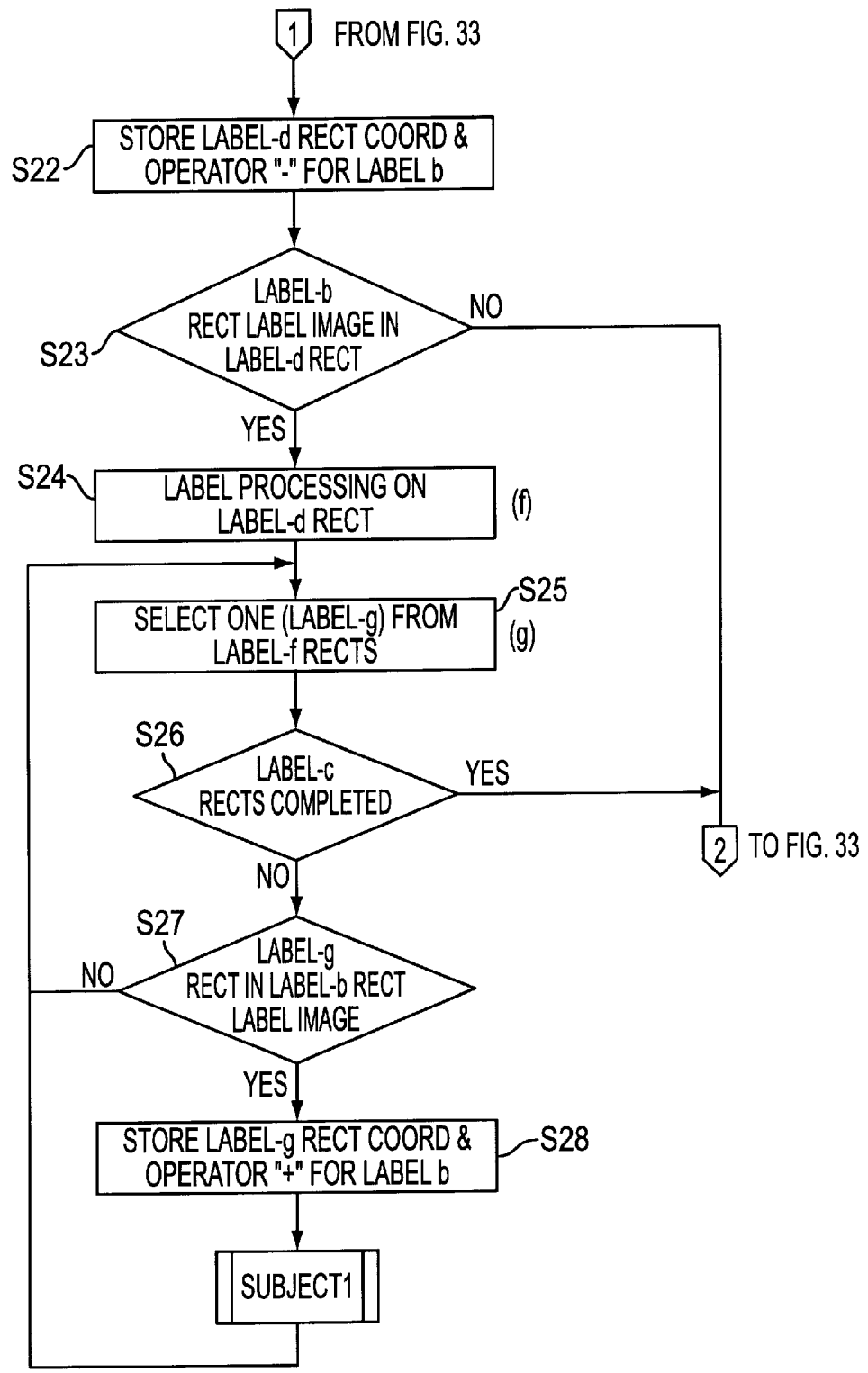

(S21) If the determination in step S19 is "no", the label image is generated for the label-b rectangle selected in step S05 and the processing proceeds to the procedure in FIG. 34.

(S22) The coordinates of the label-d rectangle selected in step S11 is stored in the "sub-rectangle" area of FIG. 37, corresponding to label b. Then, an operator "−" (minus) is stored in the corresponding "operator" area. In the example shown in FIG. 31B, the coordinates of the label(1-2) rectangle selected in step S11 and an operator "−" (minus) are stored in the area corresponding to label 1-1.

(S23) It is determined whether the label-b rectangle selected in step S05 is included in the above-processed label-d rectangle. As the label-d rectangle is included completely in the label-b rectangle in this example, it is determined that the label-b rectangle is included in the label-d rectangle.

(S24) The label processing is performed further on the label-d rectangle selected in step S11. In the example shown in FIG. 31B, the label-(1-2) rectangle selected in step S11 is divided further into label-(1-2) and label-(1-3) rectangles.

(S25) A label-g rectangle is selected from the label-f rectangles above obtained. In the example shown in FIG. 31B, a label-(1-3) rectangle is selected from the label-(1-2) and label-(1-3) rectangles obtained in step S14.

(S26) It is determined whether all the labels obtained in step S24 have been processed.

(S27) It is determined whether the label-g rectangle selected in step S25 includes the label image of the label-b rectangle selected in step S05.

(S28) If the determination in step S27 is "yes", the coordinates of the label-g rectangle selected in step S05 is stored in the "sub-rectangle" area of FIG. 37, corresponding to label b. Then, an operator "+" (plus) is stored in the corresponding "operator" area.

In the example shown in FIG. 31B, the coordinates of the label-(1-3) rectangle selected in step S25 is stored in the area corresponding to label 1-1 and an operator "+" (plus) is given to the label 1-3. There may be in the label-g rectangle, a rectangle which is not included in the label-b rectangle and therefore, the processing returns to step S25 to re-execute the SUBJECT 1 with the label g replaced by the label b.

Based on the above processing results, the overlapping rectangle (parent rectangle) can be represented by using the label (or coordinates) and the operator of the child rectangles stored in the overlapping rectangle storage shown in FIG. 37. In the example shown in FIG. 31B, the connected element A1 whose pixels are labeled as 1 is represented by using the label-(1-1) parent rectangle and the label-(1-2) and label-(1-3) child rectangles included in the parent rectangle:

$$A1=(1\text{-}1)-(1\text{-}2)+(1\text{-}3)$$

When the label-g rectangle is not a part of the label image of the label-b rectangle in the above step S27, a following label-g rectangle is selected in step S25, from the label-f rectangles obtained in step S24 and the above processing is conducted on the selected label-g rectangle. When the processing has been completed for all the rectangles obtained in step S24 or when it is determined that a part of the label-b rectangle selected in step S05 is not included in the label-d rectangle selected in step S11, the processing returns to step S11. Then, a following rectangle is selected from the rectangles obtained in step S10 and thereafter, the foregoing processing is conducted on the above-selected rectangle.

In the example shown in FIG. 31B, since, in step S12, there is none left to be processed of the rectangles obtained in step S10 when the label-(1-2) rectangle is processed, the SUBJECT 1 is completed. When the SUBJECT 1 is completed, the processing returns to step S05 (FIG. 32), where a label-b rectangle which is next smaller in size is selected from the rectangles obtained in step S05 (see FIG. 36-table). In the example shown in FIG. 36, a label-4 rectangle is selected. In the example shown in FIG. 31B, a label-(2-1) rectangle is selected.

When the processing has not been completed for all the label-a rectangles obtained in step S04 and when the processing has not been completed for all the rectangles that the label-b rectangles obtained in step S05 overlaps with, the foregoing SUBJECT 1 is executed in step S09. In the example shown in FIG. 31B, since label-1 and label-2 rectangles are obtained in step S04, selecting a label-2 rectangle in step S05 causes the processing to end for all the rectangles that the selected rectangle overlaps with. Then, in step S08, all the rectangles that the label-2 rectangle overlaps with are stored in the "overlapping rectangle" area corresponding to label 2, as shown in the table of FIG. 37. Since the label image of the label-1 rectangle differs from that of the label-2 rectangle, an operator "−" (minus) is stored in the "operator" area corresponding to label 1. Accordingly, the connected element A2 having label 2 is expressed:

$$A2=(2\text{-}1)-A1=(2\text{-}1)-\{(1\text{-}1)-(1\text{-}2)+(1\text{-}3)\} \qquad (2)$$

Thus, the overlapping rectangle can be expressed by using the results of the rectangle already processed, without need to execute the SUBJECT 1.

When it is determined in step S07 that the processing has been completed for some rectangles, not necessarily for all the rectangles, if a label-d rectangle which is included in a rectangle already processed in the SUBJECT 1, is selected in step S11, the processing goes from step S13 to step S14. In this case, the label number of the label-d rectangle which has already been processed is stored as it is, in the "overlapping rectangle" area corresponding to the selected rectangle.

Furthermore, if the determination in step S17 that the label-e sub-rectangles calculated in step S16 include plural labels and a label not yet processed, is "no", the coordinates of the label-d rectangle selected in step S11 is stored in the "overlapping rectangle" area corresponding to the rectangle currently being processed. Since the label-d rectangle differs from the label image of the label-b rectangle, an operator "−" (minus) is given to the label-d rectangle.

Figure 35:
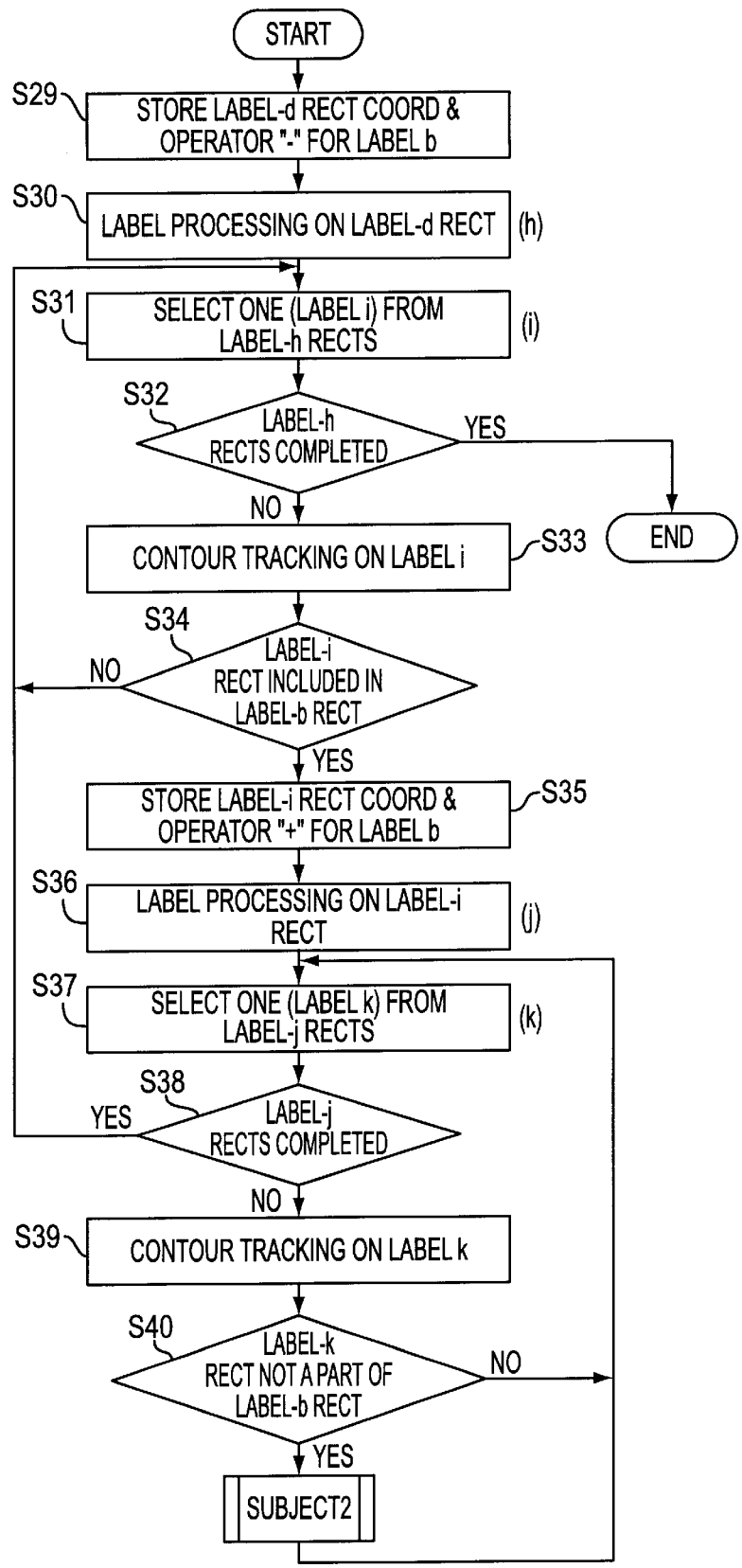

When the selected label-b rectangle is determined to be larger than the pre-determined value in the SUBJECT 1 step S19, the SUBJECT 2 is executed according to the procedure shown in FIG. 35.

(S29) In FIG. 35, the same processing as step S18 is executed on the label-d rectangle selected in step S11. That is, the coordinates of the label-d rectangle are stored in the "overlapping rectangle" area corresponding to label b.

(S30) The label processing is performed on the label-d rectangle in the same way as in step S16.

(S31) A label-i rectangle is selected from the label-h rectangles above-obtained.

(S32) It is determined whether the processing is completed for all the label-h rectangles obtained in step S30. If the determination is "yes", the SUBJECT 2 is completed.

(S33) If the determination is "no", the contour tracking is conducted on the label image of the label-i rectangle selected in step S31. The contour tracking technique is known by Junichiro Toriwaki, "Digital Image Processing II for Image Analysis," Shokodo, pp.66–79, for example.

(S34) When the contour tracking is completed for the label image of the label-i rectangle, it can be determined, based on the results of the contour tracking, whether the label-i rectangle is a part of the selected label-b rectangle. Unless the label-i rectangle is a part of the label-b rectangle, a following label-i rectangle is selected from the label-h rectangles obtained in step S30 and processed in the same way as in the above.

(S35) If the label-i rectangle is a part of the label-b rectangle, the coordinates of the label-i rectangle are stored in the "overlapping rectangle" area corresponding to label b and an operator "+" (plus) is given to the label i.

It is determined in step S34 whether the label-i rectangle is included in the parent label-b rectangle based on the results of the contour tracking. The operation is explained referring to FIG. 38. Although label images are separately labeled as 7 and 8 in FIG. 38A for easy understanding, the actual processing is executed on the binary image data. The parent rectangle labeled as 8 includes rectangles labeled as 8-1, 8-2, 8-3, and 8-4.

Figure 38B:
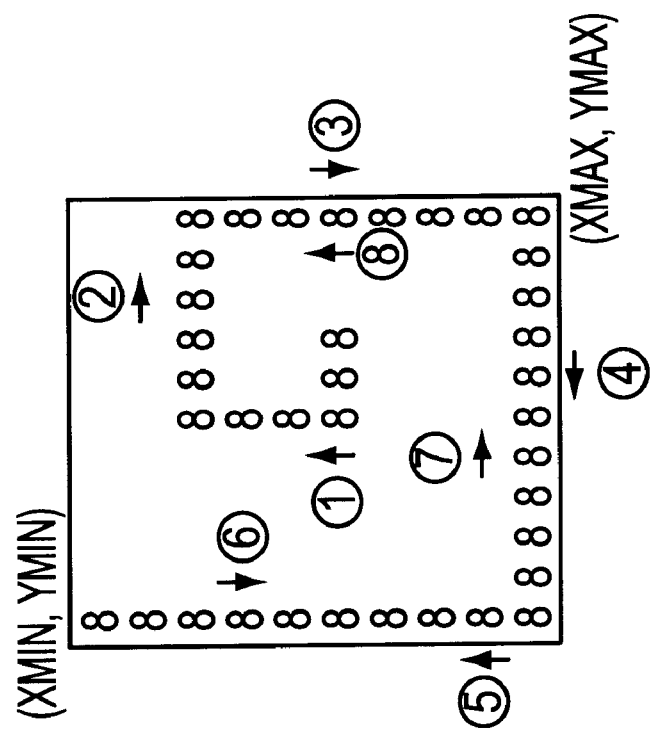
FIGS. 38A and 38B show rectangles each circuscribing a label and the contour tracking method, respectively.
Figure 38A:
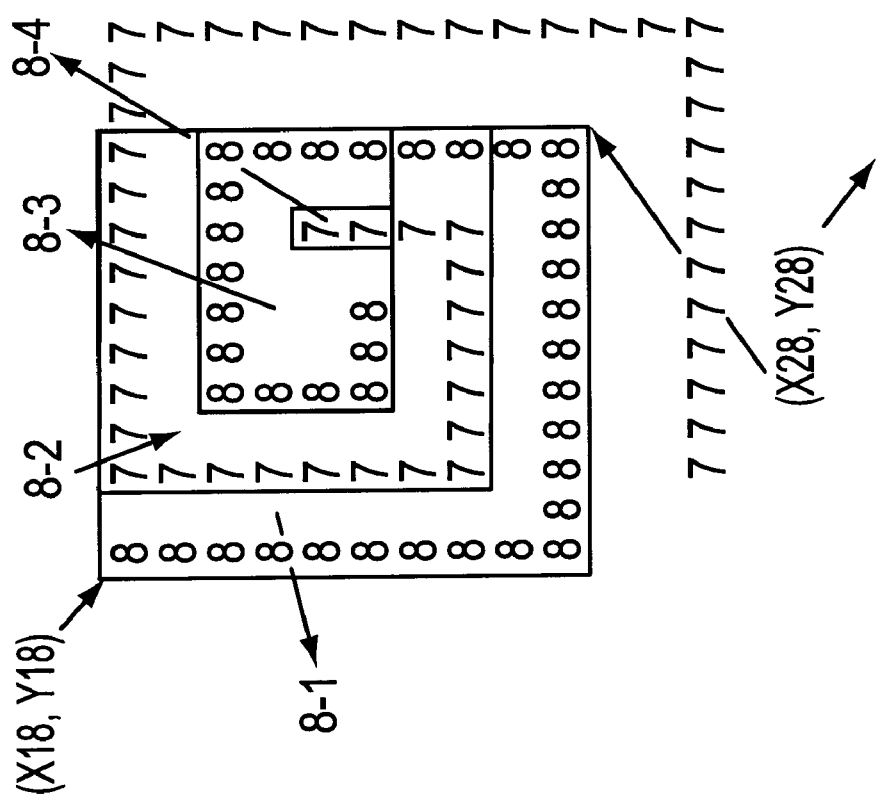

When the label-(8-3) rectangle is selected as a label-i rectangle in step S31, the contour tracking is conducted starting with a black pixel of the label-(8-3) rectangle in the order from ① to ⑧ as showing in FIG. 38B. Then, the tracking coordinate maximum (XMAX,YMAX) and minimum (XMIN,YMIN) are calculated. It is determined whether the maximum (XMAX,YMAX) and minimum (XMIN,YMIN) agree to the coordinates (x18,y18) and (x28, y28) respectively of the parent label-8 rectangle. When they agree, the label-(8-3) rectangle is determined to be included in the parent label-8 rectangle.

A pixel which is on the boundary of the selected label-(8-3) sub-rectangle and which does not belong to other sub-rectangles is chosen as one with which the contour tracking is started. If the tracking exceeds the parent label-8 rectangle during execution of the contour tracking, the sub-rectangle including the pixels which are being tracked is determined not to be included in the parent label-8 rectangle.

When the above processing is completed, the label processing is further performed on the label-i rectangle in step S36. Then, a label-k rectangle is selected from the the label-j rectangles obtained through the label processing in S37. In step S38, the contour tracking is conducted on the thus-selected label-k rectangle for all the label-j rectangles obtained in step S36. Based on the contour tracking results, it is determined in step S40 whether each of the selected label-k rectangles is a part of the parent label-b rectangle. Then, the SUBJECT 2 is performed repeatedly on a label-k rectangle which is determined not to be a part of the parent label-b rectangle, to proceed with a label within the label-k rectangle.

According to the sixth embodiment as described above, the image is partitioned into a plurality of labeled rectangles. For non-overlapping rectangles, respective coordinates are stored. For overlapping rectangles, the processing is conducted on the rectangles in the order of smaller size and a label image is generated only for a rectangle of a size smaller than a pre-determined value. Based on the label image thus-generated, the structure of rectangle overlapping is analyzed, to allow a decrease in storage capacity of the work memory 113. Also, the results obtained in the previous processing are utilized (steps S08, S14 and S18) for processing an overlapping rectangle, to increase the processing speed with decreasing storage capacity of the work memory 113. In processing a rectangle of a size larger than a predetermined value, the structure of overlapping rectangles is analyzed using the contour tracking technique, also to allow a decrease in storage capacity of the work memory 113.

A rectangle may be specified in other methods, without being limited to the top-left and bottom-right coordinates as used in the foregoing embodiment.

Although a label-d rectangle is selected from the overlapping label-b rectangles in the order of smaller size as described above, it may be selected by priority from rectangles included in others. When a rectangle of a comparatively large size is to be processed, a sub-rectangle included therein should already be processed and therefore, the results of processing the sub-rectangle can be utilized, accordingly to increase the processing speed with decreasing storage capacity of the work memory 113.

What is claimed is:

1. An apparatus responsive to an input binary image signal for outputting data for generating a connected element which is an area including a same label in a label image, comprising:

binary image storage means for storing therein the input binary image signal as binary image data;

labeling means for performing label processing on the binary image data and generating the label image;

rectangle calculation means, based on the label image data, for calculating a rectangle circumscribing a same label and rectangle definition data defining the rectangle by the label and a position in the label image;

overlap determination means based on the rectangle definition data for determining whether a rectangle calculated by said rectangle calculation means is an overlapping or non-overlapping rectangle depending on whether or not the rectangle overlaps with other rectangles; and output means for outputting data comprising the binary image data, the rectangle definition data and the label image data of the overlapping rectangle, as the data for generating the connected element.

2. An apparatus according to claim 1, wherein said overlap determination means comprises:

first determination means for determining whether one or more vertexes of the second rectangle are inside the first rectangle or whether two or more vertexes of the second rectangle are on a boundary of the first rectangle;

second determination means for determining whether one vertex of the second rectangle is on a boundary of the first rectangle or whether one vertex of the second rectangle is on a vertex of the first rectangle;

third determination means for determining whether one or more vertexes of the first rectangle are inside the second rectangle, if the determination by said determination means is positive;

fourth determination means for determining whether two vertexes of the second rectangle are on a boundary of the first rectangle;

fifth determination means for determining whether two or more vertexes of the first rectangle are on a boundary of the second rectangle, if the determination by said fourth determination means is positive; and means for determining that the first and second rectangles overlap with each other, if the determination by any of said first, third and fifth determination means is positive.

3. An apparatus according to claim 2, wherein said overlap determination means further comprises:

setting means for setting different positional values respectively to positional relationships that a vertex of one of the first and second rectangles is 'inside', 'on a boundary of', 'on a vertex of' and 'outside' the other rectangle; and addition means for adding the positional values for four vertexes of the rectangle, and wherein said first to fifth determination means compare the addition result with respective predetermined values and make the determination depending on the comparing.

4. An apparatus according to claim 2, wherein said overlap determination means calculates a distance between the two rectangles and determines the rectangles as not overlapping with each other if the distance is lager than a predetermined value; otherwise makes the determination.

5. An apparatus according to claim 1, wherein said output means further outputs the rectangle definition data of the non-overlapping rectangle.

6. An apparatus according to claim 1, wherein said output means represents the label image data by the label and binary image data obtained by replacing the label of the label image by a binary number 1.

7. An apparatus responsive to an input binary image signal for outputting data for generating a connected element which is an area including a same label in a label image, comprising:

binary image storage means for storing therein the input binary image signal as binary image data;

rectangle calculation means for performing label processing on the binary image data to generate the label image and calculating a rectangle circumscribing a same label and rectangle definition data defining the rectangle by the label and a position in the label image;

overlap determination means based on the rectangle definition data for determining whether a rectangle calculated by said rectangle calculation means is an overlapping or non-overlapping rectangle depending on whether or not the rectangle overlaps with others;

re-labeling means for performing label processing again on the binary image data of the overlapping rectangle and generating the label image thereof; and output means for outputting data comprising the binary image data, the rectangle definition data and the label image data of the overlapping rectangle, as the data for generating the connected element.

8. An apparatus according to claim 7, wherein said overlap determination means comprises:

first determination means for determining one of whether at least one vertex of the second rectangle is inside the first rectangle and whether at least two vertexes of the second rectangle are on a boundary of the first rectangle;

second determination means for determining one of whether one vertex of the second rectangle is on a boundary of the first rectangle and whether one vertex of the second rectangle is on a vertex of the first rectangle;

third determination means for determining whether at least one vertex of the first rectangle is inside the second rectangle, if the determination by said determination means is positive;

fourth determination means for determining whether two vertexes of the second rectangle are on a boundary of the first rectangle;

fifth determination means for determining whether at least two vertexes of the first rectangle are on a boundary of the second rectangle, if the determination by said fourth determination means is positive; and means for determining that the first rectangle overlaps the second rectangle, if the determination by at least one of said first determination means, said third determination means and said fifth determination means is positive.

9. An apparatus according to claim 7, wherein said output means further outputs the rectangle definition data of the non-overlapping rectangle.

10. An apparatus according to claim 7, wherein said output means represents the label image data by the label and binary image data obtained by replacing the label of the label image by a binary number 1.

11. A method for outputting from an input binary signal, data for generating a connected element which is an area including a same label in a label image, said method comprising the steps of:

(a) storing the input binary image signal as binary image data;

(b) labeling the binary image data by performing label processing on the binary image data stored in step (a) and generating the label image data;

(c) calculating a rectangle, based on the label image data, circumscribing a same label and rectangle definition data for defining the rectangle by the label and a position in the label image;

(d) determining that a rectangle calculated in step (c) overlaps with others based on the rectangle definition data; and (e) outputting data comprising the binary image data, the rectangle definition data and the label image data of the overlapping rectangle, as the data for generating the connected element.

12. A method according to claim 11, wherein said determining in step (d) comprises the steps of:

(h) determining whether one or more vertexes of the second rectangle are inside the first rectangle or whether two or more vertexes of the second rectangle are on a boundary of the first rectangle;

(i) determining whether one vertex of the second rectangle is on a boundary of the first rectangle or whether one vertex of the second rectangle is on a vertex of the first rectangle;

(j) determining whether one or more vertexes of the first rectangle are inside the second rectangle, if the determination by said determination means is positive;

(k) determining whether two vertexes of the second rectangle are on a boundary of the first rectangle;

(l) determining whether two or more vertexes of the first rectangle are on a boundary of the second rectangle, if the determination by said fourth determination means is positive; and (m) determining that the first and second rectangles overlap with each other if the determination by any of said first, third and fifth determination means is positive.

13. A method according to claim 12, wherein said determining in step (d) further comprises:

(n) setting different positional values respectively to positional relationships that a vertex of one of the first and second rectangles is 'inside', 'on a boundary of', 'on a vertex of' and 'outside' the other rectangle; and (o) adding the positional values for four vertexes of the rectangle, and wherein said determining in steps (h)–(l) compare the addition result in step (o) with respective predetermined values and make the determination depending on the comparing.

14. A method according to claim 12, wherein said determining in step (d) calculates a distance between the two rectangles and determines the rectangles as not overlapping with each other if the distance is larger than a predetermined value; otherwise makes the determination.

15. A method according to claim 11, wherein said outputting in step (e) further outputs the rectangle definition data of the non-overlapping rectangle.

16. A method according to claim 11, wherein said outputting in step (e) represents the label image data by the label and binary image data obtained by replacing the label of the label image by a binary number 1.

17. A method for outputting from an input binary image signal, data for generating a connected element which is an area including a same label in a label image, said method comprising the steps of:

(a) storing the input binary image signal as binary image data;

(b) performing label processing on the binary image data stored in step (a), and generating the label image and calculating a rectangle circumscribing a same label and rectangle definition data defining the rectangle by the label and a position in the label image;

(c) determining that a rectangle calculated in step (b) overlaps with other rectangles based on the rectangle definition data;

(d) re-labeling the overlapping rectangle determined in step (c) by performing label processing on the binary image data of the overlapping rectangle and generating the label image thereof; and (e) outputting data comprising the binary image data, the rectangle definition data and the label image data of the overlapping rectangle, as the data for generating the connected element.

18. A method according to claim 17, wherein said outputting in step (e) further outputs the rectangle definition data of the non-overlapping rectangle.

19. A method according to claim 17, wherein said outputting in step (e) represents the label image data by the label and binary image data obtained by replacing the label of the label image by a binary number 1.

20. An apparatus responsive to an input binary image signal for outputting data for generating a connected element which is an area including a same label in a label image, comprising:

detection means for detecting in the label image that a first rectangle circumscribing a first label includes a second rectangle circumscribing a second label; and output means, based on the detecting by said detection means, for outputting data obtained by an addition/subtraction of the second rectangle to/from the first rectangle, as the data for generating the connected element having the first label.

21. An apparatus according to claim 20, wherein said output means further outputs the label image data of the first rectangle.

22. An apparatus responsive to an input binary image signal for outputting data for generating a connected element which is an area including a same label in a label image, comprising:

detection means for detecting in the label image that a first rectangle circumscribing a first label overlaps with a second rectangle circumscribing a second label; and output means, based on the detecting by said detection means, for outputting data obtained by an addition/subtraction of an area where the first and second rectangles overlap with each other, to/from the first rectangle as the data for generating the connected element.

23. An apparatus according to claim 21, wherein said output means further outputs the label image data of the first rectangle.

24. An apparatus responsive to an input binary image signal for outputting data for generating a connected element which is an area including a same label in a label image, comprising:

binary image storage means for storing therein the input binary image signal as binary image data;

labeling means for performing label processing on the binary image data and generating the label image;

rectangle calculation means, based on the label image data, for calculating a rectangle circumscribing a same label and rectangle definition data defining the rectangle by the label and a position in the label image;

overlap determination means based on the rectangle definition data, for determining whether a rectangle calculated by said rectangle calculation means is an overlapping or non-overlapping rectangle depending on whether or not the rectangle overlaps with other rectangles;

division means for dividing the overlapping rectangle as a parent-rectangle into child-rectangles according to the label included in the parent-rectangle and for calculating rectangle-definition data of the child-rectangles;

label check means for checking whether the child-rectangles share a same label or different labels; and output means for outputting data comprising binary image data, the rectangle definition data of the non-overlapping rectangle, the rectangle definition data of both the parent-rectangle and child-rectangles which share a same label, and the label image data of the parent-rectangle whose child-rectangles share different labels.

25. An apparatus according to claims 24, wherein said output means outputs the label image data of the parent-rectangle whose child-rectangles share different labels, by the label and a binary image data obtained by replacing the label of the label image by a binary number 1.

26. An apparatus according to claim 24, wherein said label check means makes the checking by performing the label processing on the parent rectangle to generate the label image and comparing the label of the parent rectangle with those of the child rectangles.

27. An apparatus responsive to an input binary image signal for outputting data for generating a connected element which is an area including a same label in a label image, comprising:

binary image storage means for storing therein the input binary image signal as binary image data;

rectangle calculation means for performing label processing on the binary image data to generate the label image and calculating a rectangle circumscribing a same label and rectangle definition data defining the rectangle by the label and a position in the label image;

overlap determination means based on the rectangle definition data for determining whether a rectangle calculated by said rectangle calculation means is an overlapping or non-overlapping rectangle depending on whether or not the rectangle overlaps with others;

re-labeling means for performing label processing again on the binary image data of the overlapping rectangle and generating the label image thereof;

division means, based on the label image generated by said re-labeling means, for dividing the overlapping rectangle as a parent-rectangle, into child-rectangles according to the label and for calculating rectangle-definition data of the child-rectangles;

label check means for checking whether the child-rectangles share a same label or different labels; and output means for outputting data comprising the binary image data, the rectangle definition data of the non-overlapping rectangle, the rectangle definition data of both the parent-rectangle and child-rectangles which share a same label, and the label image data of the parent-rectangle whose child-rectangles share different labels.

28. An apparatus according to claims 27, wherein said output means represents the label image data of the parent-rectangle whose child-rectangles share a different labels, by the label and a binary image data obtained by replacing the label of the label image by a binary number 1.

29. An apparatus responsive to an input binary image signal for outputting data for generating a connected element which is an area including a same label in a label image, comprising:

binary image storage means for storing therein the input binary image signal as binary image data;

rectangle calculation means for preforming label processing on the binary image data to generate the label image and calculating a rectangle circumscribing a same label and rectangle definition data defining the rectangle by the label and a position in the label image;

overlap determination means based on the rectangle definition data, for determining whether a rectangle calculated by said rectangle calculation means is an overlapping or non-overlapping rectangle depending on whether or not the rectangle overlaps with others;

re-labeling means for performing the label processing again on the binary image data of the overlapping rectangle and generating the label image thereof;

division means, based on the label image generated by said re-labeling means, for dividing the overlapping rectangle as a parent-rectangle into child-rectangles and repeatedly subdividing the child-rectangle into final child-rectangles which respectively have a same label and for calculating rectangle-definition data of the final child-rectangle; and output means for outputting data comprising the binary image data, the rectangle definition data of the non-overlapping rectangle, and the rectangle definition data of the parent-rectangle and the final child-rectangles calculated by said division means.

30. An apparatus according to claim 29, wherein said division means comprises:

label comparison means for comparing the label of each child-rectangle with that of the parent rectangle; and operator adding means for adding to each child-rectangle, an operator indicating match or mismatch depending on the comparing by said label comparison means, and wherein said output means further outputs the operator.

31. An apparatus according to claim 30, wherein said division means further comprises local labeling means for performing the label processing on an area enclosing a child rectangle to generate a label image of the area, wherein said label comparison means compares the label of the child rectangle with that of the parent rectangle based on the label image generated by said local labeling means, and wherein said operator adding means adds the operator to the child rectangle depending on the comparing by said label comparison means.

32. A method for outputting, from an input binary image signal, data for generating a connected element which is an area including a same label in a label image, said method comprising the steps of:

(a) detecting in a label image that a first rectangle circumscribing a first label includes a second rectangle circumscribing a second label; and (b) based on the detecting in step (a), outputting data obtained by an addition/subtraction of the second rectangle to/from the first rectangle, as the data for generating the connected element having the first label.

33. A method according to claim 32, wherein said outputting in step (b) further outputs the label image of the first rectangle.

34. A method for outputting, from an input binary image signal, data for generating a connected element which is an area including a same label in a label image, said method comprising the steps of:

(a) detecting in the label image that a first rectangle circumscribing a first label overlaps with a second rectangle circumscribing a second label; and (b) based on the detecting in step (a), outputting data obtained by an addition/subtraction of an area where the first and second rectangles overlap with each other, to/from the first rectangle.

35. A method according to claim 34, wherein said outputting in step (b) further outputs the label image of the first rectangle.

36. A method for outputting, from an input binary image signal, data for generating a connected element which is an areas including a same label in a label image, said method comprising the steps of:

(a) storing the input binary signal as binary image data;

(b) performing label processing on the binary image data stored in step (a) and generating the label image;

(c) calculating a rectangle circumscribing a same label based on the label image data, and rectangle definition data defining the rectangle by the label and a position in the label image;

(d) determining whether a rectangle calculated in step (c) is an overlapping or non-overlapping rectangle depending on whether the rectangle overlaps with other rectangles or not;

(e) dividing the overlapping rectangle as a parent-rectangle into child-rectangles according to the label included in the parent-rectangle and calculating rectangle-definition data of the child-rectangles;

(f) checking whether the child-rectangles share a same label or different labels; and (g) outputting the binary image data, the rectangle definition data of the non-overlapping rectangle, the rectangle definition data of both the parent-rectangle and child-rectangles which share a same label, and the label image data of the parent-rectangle whose child-rectangles share different labels.

37. A method according to claim 36, wherein said outputting in step (g) represents the label-image data of the parent-rectangle whose child-rectangles share different labels, by the label and a binary image data obtained by replacing the label of the label image by a binary number 1.

38. A method according to claim 36, wherein said checking in step (f) makes the checking by performing the label processing on the parent rectangle to generate the label image and comparing the label of the parent rectangle with those of the child-rectangles.

39. A method for outputting, from an input binary image signal, data for generating a connected element which is an area including a same label in a label image, said method comprising the steps of:

(a) storing the input binary signal as binary image data;

(b) performing label processing on the binary image data stored in step (a) to generate the label image and calculating a rectangle circumscribing a same label and rectangle definition data defining the rectangle by the label and a position in the label image;

(c) determining whether a rectangle calculated in step (b) is an overlapping or non-overlapping rectangle depending on whether or not the rectangle overlaps with others;

(d) performing label processing again on the binary image data of the overlapping rectangle and generating the label image thereof;

(e) based on the label image generated in step (d), dividing the overlapping rectangle as a parent-rectangle, into child-rectangles according to the label and calculating rectangle-definition data of the child-rectangles;

(f) checking whether the child-rectangles share a same label or different labels; and (g) outputting the binary image data stored in step (a), the rectangle definition data of the non-overlapping rectangle, the rectangle definition data of both the parent-rectangle and child-rectangles which share a same label, and the label image data of the parent-rectangle whose child-rectangles share different labels.

40. A method according to claim 39, wherein said outputting in step (g) represents rectangle whose child-rectangles share a different labels, by the label and a binary image data obtained by replacing the label of the label image by a binary number 1.

41. A method for generating, from an input binary image signal, data for generating a connected element which is an area including a same label in a label image, said method comprising the steps of:

(a) storing the input binary image signal as binary image data;

(b) performing label processing on the binary image data to generate the label image and calculating a rectangle circumscribing a same label and rectangle definition data defining the rectangle by the label and a position in the label image;

(c) determining whether a rectangle calculated in step (b) is an overlapping or non-overlapping rectangle depending on whether or not the rectangle overlaps with others;

(d) performing the label processing on the label image data of the overlapping rectangle determined in step (c) and generating the label image thereof;

(e) based on the label image generated in step (d), dividing the overlapping rectangle as a parent-rectangle into child-rectangles and repeatedly subdividing the child-rectangle into final child-rectangles which respectively have a same label and calculating rectangle-definition data of the final child-rectangle; and (f) outputting data comprising the binary image data, the rectangle definition data of the non-overlapping rectangle, and the rectangle definition data of the parent-rectangle and the final child-rectangles calculated in step (e).

42. A method according to claim 41, wherein said dividing in step (e) comprises the steps of:

(g) comparing the label of each child rectangle with that of the parent rectangle; and (h) adding to each child-rectangle, an operator indicating match or mismatch depending on said comparing in step (g), and wherein said outputting in step (f) further outputs the operator.

43. A method according to claim 42, wherein said dividing in step (e) further comprises the step of (i) performing the label processing on an area enclosing a child rectangle to generate a label image of the area, wherein said comparing in step (i) compares the label of the child rectangle with that of the parent rectangle based on the label image generated in step (i), and wherein said adding in step (h) adds the operator to the child rectangle depending on said comparing in step (i).

44. An apparatus for extracting from an input binary image signal a connected element which is an area including a same label in a label image, comprising:

rectangle calculation means for calculating a rectangle circumscribing a same label based on the label image data generated from the binary image data;

overlap detection means for detecting rectangles which overlap with each other and correspond to respective connected elements;

division means for selecting one of the overlapping rectangles detected by said overlap detection means in a pre-determined order and for dividing the selected rectangle into sub-rectangles;

sub-rectangle determination means for determining which of the connected elements the sub-rectangle belongs to;

first specification means for specifying a first connected element depending on the determination by said sub-rectangle determination means; and second specification means for specifying a second connected element by using the first connected element specified by said first specification means.

45. An apparatus according to claim 44, wherein, when a rectangle includes a sub-rectangle which has already been used for specifying a connected element, said second specification means specifies a connected element by using the specified connected element.

46. An apparatus according to claim 44, wherein, when a rectangle includes a sub-rectangle which has already been used for specifying a connected element, said second specification means specifies a connected element by using a portion of the specified connected element, on which portion the rectangles overlap with each other.

47. An apparatus according to claim 44, wherein said division means selects the overlapping rectangles detected by said overlap detection means in the order of smaller size.

48. An apparatus according to claim 44, wherein said division means selects a rectangle included by others by priority of the overlapping rectangles detected by said overlap detection means.

49. An apparatus according to claim 44, wherein said sub-rectangle determination means comprises:

contour tracking means for performing contour tracking starting with a particular pixel within a sub-rectangle as a tracking starting pixel; and first sub-rectangle determination means, according to a result of the contour tracking, for determining whether the sub-rectangle belongs to a connected element corresponding to the selected rectangle.

50. An apparatus according to claim 49, wherein said first sub-rectangle determination means determines that a rectangle including the tracking starting pixel is included in a connected element when a rectangle defined by maximum and minimum coordinates which are obtained by the contour tracking agrees to the rectangle circumscribing the connected element.

51. An apparatus according to claim 49, wherein said contour tracking means selects as the tracking starting, a pixel which in on the boundary of the selected rectangle and which does not belong to a non-selected rectangle.

52. An apparatus according to claim 49, wherein said first sub-rectangle determination means determines that the sub-rectangle including the track starting pixel does not belong to a connected element corresponding to the selected rectangle, when the tracking exceeds the selected rectangle during execution of the contour tracking.

53. An apparatus according to claim 44, wherein said sub-rectangle determination means comprises:

size determination means for determining whether the selected rectangle is larger in size than a pre-determined value;

label image generation means, when the selected rectangle is determined to be larger in size than a pre-determined value by said size determination means, for generating a label image corresponding to a connected element included in the selected rectangle; and second sub-rectangle determination means, based on the label image, for determining which of the connected elements the sub-rectangle belongs to.

54. An apparatus according to claim 53, wherein, when a rectangle includes a rectangle which overlaps with the selected rectangle and which has already been used for specifying a connected element, said second specification means specifies a connected element of the selected rectangle by using the specified connected element.

55. An apparatus according to claim 54, wherein said division means selects the overlapping rectangles detected by said overlap detection means in the order of smaller size.

56. An apparatus responsive to an input binary image signal for outputting data for generating a connected element which is an area including a same label in a label image, comprising:

binary image storage means for storing therein the input binary image signal as binary image data;

labeling means for performing label processing on the binary image data and generating the label image;

rectangle calculation means, based on the label image data, for calculating a rectangle circumscribing a same label and rectangle definition data defining the rectangle by the label and a position in the label image;

overlap determination means based on the rectangle definition data, for determining whether a rectangle calculated by said rectangle calculation means is an overlapping rectangle that extends and encroaches into an encompassed space of another rectangle or a non-overlapping rectangle that does not extend and encroach into an enclosed space of another rectangle in depending on whether or not the rectangle overlaps with other rectangles; and output means for outputting data comprising the binary image data, the rectangle definition data and the label image data of the overlapping rectangle, as the data for generating the connected elements.

57. A method comprising:

generating label image data from an image, said label image data contains a plurality of labels;

generating rectangle data representing rectangles that circumscribe a same label; and generating overlap data representing the rectangles that overlap with other rectangles.

58. A computer readable storage instructing a computer to perform a method comprising:

generating label image data from an image, said label image data contains a plurality of labels;

generating rectangle data representing rectangles that circumscribe a same label; and generating overlap data representing the rectangles that overlap with other rectangles.

59. An apparatus comprising:

a label generator generating label image data from an image, said label image data contains a plurality of labels;

a rectangle generator generating rectangle data representing rectangles that circumscribe a same label; and an overlap generator generating overlap data representing the rectangles that overlap with other rectangles.

* * * * *

UNITED STATES PATENT AND TRADEMARK OFFICE
CERTIFICATE OF CORRECTION

PATENT NO.: 6,081,618
DATED : June 27, 200
INVENTOR(S): Satoshi NAOI et al.

It is certified that error appears in the above-identified patent and that said Letters Patent is hereby corrected as shown below:

On the title page, block [56] References Cited, Other Publications, line 5, change "Patternn" to --Pattern--.

Col. 19, line 39, change "lager" to --larger--.

Signed and Sealed this

Twenty-fourth Day of April, 2001

Attest:

NICHOLAS P. GODICI

Attesting Officer

Acting Director of the United States Patent and Trademark Office